US012543021B2

(12) United States Patent
Ling et al.

(10) Patent No.: US 12,543,021 B2
(45) Date of Patent: Feb. 3, 2026

(54) METHOD AND APPARATUS FOR HANDLING MULTICAST BROADCAST SERVICE

(71) Applicant: Telefonaktiebolaget LM Ericsson (publ), Stockholm (SE)

(72) Inventors: Jie Ling, Shanghai (CN); Hans Bertil Rönneke, Kungsbacka (SE); Shabnam Sultana, Montreal (CA); Juying Gan, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 393 days.

(21) Appl. No.: 17/999,700

(22) PCT Filed: Apr. 11, 2021

(86) PCT No.: PCT/CN2021/086340
§ 371 (c)(1),
(2) Date: Nov. 22, 2022

(87) PCT Pub. No.: WO2021/232998
PCT Pub. Date: Nov. 25, 2021

(65) Prior Publication Data
US 2023/0300572 A1    Sep. 21, 2023

(30) Foreign Application Priority Data
May 22, 2020 (WO) ................ PCT/CN2020/091916

(51) Int. Cl.
*H04H 20/71* (2008.01)
*H04W 4/06* (2009.01)

(52) U.S. Cl.
CPC .................... *H04W 4/06* (2013.01)

(58) Field of Classification Search
CPC ......... H04W 4/06; H04W 4/02; H04W 76/40; H04W 4/021; H04W 72/30; H04W 88/18
See application file for complete search history.

(56) References Cited

U.S. PATENT DOCUMENTS 8,855,038 B2    10/2014  Huang
10,051,440 B2 *  8/2018  Åkesson ............... H04W 76/40
(Continued)

FOREIGN PATENT DOCUMENTS

CN    109699013 A    4/2019
CN    109936506 A    6/2019
(Continued)

OTHER PUBLICATIONS

Google Translation of IDS Reference CN-110972078 (performed and retrieved Feb. 24, 2025).*
(Continued)

*Primary Examiner* — Stephen M D Agosta
(74) *Attorney, Agent, or Firm* — Nicholson De Vos Webster & Elliott LLP

(57) ABSTRACT

A method and apparatus for multicast broadcast service. The method implemented at an access and mobility management function (AMF) entity comprises receiving a message for starting a multicast/broadcast (MB) session from a session management function (SMF) entity. The message comprises first location information. The method further comprises sending an MB session joining accept, reject, or cancel message to at least one terminal device based on the first location information.

5 Claims, 24 Drawing Sheets

(56) References Cited

U.S. PATENT DOCUMENTS

| | | | |
|---|---|---|---|
| 10,368,340 B2* | 7/2019 | Lu | H04N 21/4131 |
| 10,397,758 B2* | 8/2019 | Albasheir | H04W 24/08 |
| 10,477,443 B2* | 11/2019 | Ranta-Aho | H04W 36/0007 |
| 10,506,469 B1* | 12/2019 | Gottardi | H04L 67/1014 |
| 10,952,176 B2* | 3/2021 | Bharatia | H04L 65/80 |
| 11,937,272 B2* | 3/2024 | Baek | H04W 72/30 |
| 2006/0171369 A1* | 8/2006 | Ostrup | H04L 12/189 370/349 |
| 2012/0182921 A1* | 7/2012 | Tsuboi | H04W 52/0241 370/312 |
| 2014/0204830 A1* | 7/2014 | Wang | H04W 48/10 370/312 |
| 2014/0376441 A1* | 12/2014 | Lohmar | H04L 67/60 370/312 |
| 2015/0208209 A1* | 7/2015 | Jamadagni | H04L 67/568 370/312 |
| 2015/0257127 A1* | 9/2015 | Huarui | H04W 72/30 370/312 |
| 2016/0227385 A1* | 8/2016 | Ahmad | H04L 65/1073 |
| 2017/0311304 A1* | 10/2017 | Lu | H04N 21/4131 |
| 2018/0192289 A1* | 7/2018 | Dao | H04W 12/03 |
| 2018/0270778 A1* | 9/2018 | Bharatia | H04L 65/1073 |
| 2019/0075431 A1* | 3/2019 | Albasheir | H04L 67/52 |
| 2019/0132707 A1* | 5/2019 | Prasad | H04W 4/06 |
| 2019/0158985 A1* | 5/2019 | Dao | H04W 28/04 |
| 2019/0223250 A1 | 7/2019 | Dao et al. | |
| 2019/0274011 A1* | 9/2019 | Yoshizawa | H04W 4/08 |
| 2019/0274130 A1* | 9/2019 | Cheng | H04W 72/12 |
| 2019/0357081 A1* | 11/2019 | Gottardi | H04L 45/28 |
| 2019/0364382 A1* | 11/2019 | Zhang | H04W 4/021 |
| 2020/0045753 A1* | 2/2020 | Dao | H04W 4/08 |
| 2020/0106624 A1* | 4/2020 | Russell | H04W 12/082 |
| 2021/0168568 A1* | 6/2021 | Dao | H04L 12/185 |
| 2021/0352537 A1* | 11/2021 | Bharatia | H04W 36/0066 |
| 2022/0400358 A1* | 12/2022 | Son | H04L 67/51 |
| 2024/0147191 A1* | 5/2024 | Ling | H04W 4/06 |
| 2024/0155436 A1* | 5/2024 | Li | H04W 36/0007 |
| 2024/0305956 A1* | 9/2024 | Gan | H04W 76/40 |
| 2025/0098029 A1* | 3/2025 | Ling | H04W 4/06 |

FOREIGN PATENT DOCUMENTS

| | | |
|---|---|---|
| CN | 110972078 A | 4/2020 |
| CO | 2019/0004130 | 7/2019 |
| KR | 10-2015-0064162 A | 6/2015 |
| WO | 2009/129728 A1 | 10/2009 |
| WO | 2014/051406 A1 | 4/2014 |
| WO | 2020/063362 A1 | 4/2020 |

OTHER PUBLICATIONS

International Search Report and Written Opinion for Application No. PCT/CN2021/086340, Jul. 8, 2021, 9 pages.

3GPP TR 23.748 V0.3.0, "3rd Generation Partnership Project; Technical Specification Group Services and System Aspects; Study on enhancement of support for Edge Computing in 5G Core network (5GC) (Release 17)," Jan. 2020, 40 pages, 3GPP Organizational Partners.

3GPP TR 23.757 V0.3.0, "3rd Generation Partnership Project; Technical Specification Group Services and System Aspects; Study on architectural enhancements for 5G multicast-broadcast services (Release 17)," Jan. 2020, 37 pages, 3GPP Organizational Partners.

3GPP TS 23.246 V16.1.0, "3rd Generation Partnership Project; Technical Specification Group Services and System Aspects; Multimedia Broadcast/Multicast Service (MBMS); Architecture and functional description (Release 16)," Dec. 2019, 77 pages, 3GPP Organizational Partners.

3GPP TS 23.468 V15.1.0, "3rd Generation Partnership Project; Technical Specification Group Services and System Aspects; Group Communication System Enablers for LTE (GCSE_LtE); Stage 2 (Release 15)," Sep. 2019, 32 pages, 3GPP Organizational Partners.

3GPP TS 23.501 V16.3.0, "3rd Generation Partnership Project; Technical Specification Group Services and System Aspects; System architecture for the 5G System (5GS); Stage 2 (Release 16)," Dec. 2019, 417 pages, 3GPP Organizational Partners.

3GPP TS 23.502 V16.3.0, "3rd Generation Partnership Project; Technical Specification Group Services and System Aspects; Procedures for the 5G System (5GS); Stage 2 (Release 16)," Dec. 2019, 558 pages, 3GPP Organizational Partners.

3GPP TS 23.503 V16.4.1, "3rd Generation Partnership Project; Technical Specification Group Services and System Aspects; Policy and charging control framework for the 5G System (5GS); Stage 2 (Release 16)," Apr. 2020, 115 pages, 3GPP Organizational Partners.

3GPP TS 38.300 V16.0.0, "3rd Generation Partnership Project; Technical Specification Group Radio Access Network; NR; NR and NG-RAN Overall Description; Stage 2 (Release 16)," Dec. 2019, 101 pages, 3GPP Organizational Partners.

3GPP TS 38.413 V16.1.0, "3rd Generation Partnership Project; Technical Specification Group Radio Access Network; NG-RAN; NG Application Protocol (NGAP) (Release 16)," Mar. 2020, 341 pages, 3GPP Organizational Partners.

European search report and Search Opinion, EP App. No. 21808583.5, May 24, 2024, 12 pages.

International Preliminary Report on Patentability for Application No. PCT/CN2021/086340, Dec. 1, 2022, 6 pages.

Notice of Allowance, KR App. No. 10-2022-7043332, Jul. 11, 2024, 08 pages (1 page of English Translation and 07 pages of Original Document).

Office Action, KR App. No. 10-2022-7043332, Oct. 20, 2023, 9 pages (3 pages of English Translation and 6 pages of Original Document).

Office Action, CO App. No. 20220016243, Oct. 27, 2025, 18 pages of Original Document only.

* cited by examiner

772
Detecting that previously joined at least one terminal device for the MB session is not within a local area defined by the first location information

774
In response to the detection, sending, to at least one radio access network, RAN, a message for removing the previously joined at least one terminal device from the MB session

776
Sending a message to the previously joined at least one terminal device to inform the previously joined at least one terminal device that its previous joining is cancelled

778
Sending, to at least one radio access network, RAN, a message for allocating at least one resource for the MB session, wherein the message for allocating at least one resource for the MB session comprises the first location information

Receiving, from an access and mobility management function, AMF, entity, a message for allocating at least one resource for a multicast/broadcast, MB, session, wherein the message comprises first location information

792

Allocating at least one resource for the MB session based on the first location information

7111 — Receiving a request for starting a multicast/broadcast, MB, session from a multicast broadcast service function, MBSF, entity, wherein the request comprises first location information 7112 — Selecting a user plane function, UPF, entity to allocate at least one resource for the MB session based on the first location information 7113 — Sending a message for starting the MB session to an access and mobility management function, AMF, entity, wherein the message comprises the first location information

7121 Receiving a request for activating a multicast broadcast service, MBS, bearer from an application function, AF, entity, wherein the request for activating the MBS bearer comprises second location information

7122 Translating the second location information to first location information

7123 Sending a request for starting a multicast/broadcast, MB, session to a session management function, SMF, entity, wherein the request for starting the MB session comprises the first location information

FIG. 7k

METHOD AND APPARATUS FOR HANDLING MULTICAST BROADCAST SERVICE

CROSS-REFERENCE TO RELATED APPLICATIONS

This application is a National stage of International Application No. PCT/CN2021/086340, filed Apr. 11, 2021, which claims priority to International Application No. PCT/CN2020/091916, filed May 22, 2020, which are hereby incorporated by reference.

TECHNICAL FIELD

The present disclosure relates generally to the technology of wireless communication, and in particular, to methods and apparatuses for multicast broadcast service.

BACKGROUND

This section introduces aspects that may facilitate better understanding of the present disclosure. Accordingly, the statements of this section are to be read in this light and are not to be understood as admissions about what is in the prior art or what is not in the prior art.

The Third Generation Partnership Project (3GPP) developed the Multicast/Broadcast Multimedia Subsystem (MBMS) (see 3GPP Technical Specification (TS) 23.246 V16.1.0, the disclosure of which is incorporated by reference herein in its entirety) for 3rd Generation (3G) networks for video multicast/broadcasting and streaming services and later introduced the evolved MBMS (eMBMS) for the Evolved Packet System (EPS). The MBMS system has been updated to support new services such as Public Safety, Cellular Internet of Things (CIoT), and Vehicle-to-Anything (V2X).

Some study on multicast requirements and use cases for CIoT, Public Safety, V2X etc., and dedicated broadcasting requirements and use cases have been documented in the 3GPP TR 23.757 V0.3.0, the disclosure of which is incorporated by reference herein in its entirety.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide a solution for supporting local multicast/broadcast service.

A first aspect of the present disclosure provides a method implemented at an access and mobility management function, AMF, entity. The method comprises receiving a message for starting a multicast/broadcast, MB, session from a session management function, SMF, entity. The message comprises first location information. The method further comprises sending an MB session joining accept or reject or cancel message to at least one terminal device based on the first location information.

In embodiments of the present disclosure, the method may further comprise receiving a request for joining the MB session from the terminal device.

In embodiments of the present disclosure, the method may further comprise sending a response for joining the MB session to the terminal device.

In embodiments of the present disclosure, the response for joining the MB session comprises the MB session joining accept or reject information determined based on the first location information.

In embodiments of the present disclosure, the request for joining the MB session is received prior to receiving the message for starting the MB session or after receiving the message for starting the MB session.

In embodiments of the present disclosure, the method may further comprise detecting that previously joined at least one terminal device for the MB session is not within a local area defined by the first location information; and in response to the detection, sending, to at least one radio access network (RAN), a message for removing the previously joined at least one terminal device from the MB session.

In embodiments of the present disclosure, the method may further comprise sending a message to the previously joined at least one terminal device to inform the previously joined at least one terminal device that its previous joining is cancelled.

In embodiments of the present disclosure, the method may further comprise sending, to at least one radio access network (RAN), a message for allocating at least one resource for the MB session. The message for allocating at least one resource for the MB session comprises the first location information.

In embodiments of the present disclosure, the first location information comprises internal location information for a communication network.

In embodiments of the present disclosure, the first location information comprises at least one of location criteria; at least one registration area; at least one SMF service area; or at least one user plane function, UPF, service area.

In embodiments of the present disclosure, the first location information corresponds to second location information provided by an application function, AF, entity.

In embodiments of the present disclosure, the SMF entity is an MB SMF entity.

A second aspect of the present disclosure provides method implemented at a terminal device. The method comprises sending a request for joining a multicast/broadcast, MB, session to an access and mobility management function, AMF, entity. The method further comprises receiving a response for joining the MB session from the AMF entity.

In embodiments of the present disclosure, the response for joining the MB session comprises a result of accepting or rejecting the terminal device to join the MB session and the result is determined based on first location information.

In embodiments of the present disclosure, the method may further comprise receiving a message from the AMF entity to inform the terminal device that its previous joining is cancelled.

A third aspect of the present disclosure provides a method implemented at a radio access network (RAN). The method comprises receiving, from an access and mobility management function, AMF, entity, a message for allocating at least one resource for a multicast/broadcast, MB, session, wherein the message comprises first location information. The method further comprise allocating at least one resource for the MB session based on the first location information.

In embodiments of the present disclosure, the method may further comprise receiving a request for joining the MB session from the terminal device; and sending the request for joining the MB session to the AMF entity.

In embodiments of the present disclosure, the method may further comprise receiving a response for joining the MB session from the AMF entity.

In embodiments of the present disclosure, the response for joining the MB session comprises a result of accepting or rejecting the terminal device to join the MB session and the result is determined based on first location information.

In embodiments of the present disclosure, the method may further comprise sending the response for joining the MB session to the terminal device.

In embodiments of the present disclosure, the method may further comprise receiving, from the AMF entity, a message for removing previously joined at least one terminal device from the MB session.

In embodiments of the present disclosure, the method may further comprise removing the previously joined at least one terminal device from the MB session.

A fourth aspect of the present disclosure provides a method implemented at a session management function entity, SMF. The method comprises receiving a request for starting a multicast/broadcast, MB, session from a multicast broadcast service function, MBSF, entity. The request comprises first location information. The method further comprises sending a message for starting the MB session to an access and mobility management function, AMF, entity, wherein the message comprises the first location information.

In embodiments of the present disclosure, the method may further comprise selecting a user plane function, UPF, entity to allocate at least one resource for the MB session based on the first location information.

In embodiments of the present disclosure, the UPF entity is a MB UPF entity.

In embodiments of the present disclosure, the MBSF entity is included in a network exposure function, NEF, entity or a standalone entity.

In embodiments of the present disclosure, the SMF entity is an MB SMF entity.

A fifth aspect of the present disclosure provides a method implemented at a multicast broadcast service function, MBSF, entity. The method comprises receiving a request for activating a multicast broadcast service, MBS, bearer from an application function, AF, entity, wherein the request for activating the MBS bearer comprises second location information. The method further comprises translating the second location information to first location information. The method further comprises sending a request for starting a multicast/broadcast, MB, session to a session management function, SMF, entity. The request for starting the MB session comprises the first location information.

In embodiments of the present disclosure, information and the second location information correspond to a local service area of the MB session.

In embodiments of the present disclosure, the second location information comprises external location information for a communication network.

In embodiments of the present disclosure, the MBSF entity is included in a network exposure function, NEF, entity or a standalone entity.

In embodiments of the present disclosure, the SMF entity is an MB SMF entity.

A sixth aspect of the present disclosure provides a method implemented at an application function, AF, entity. The method comprises determining to activate a multicast broadcast service, MBS, bearer. The method further comprises sending a request for activating the MBS bearer to a multicast broadcast service function, MBSF, entity. The request for activating the MBS bearer comprises second location information.

Another aspect of the present disclosure provides an access and mobility management function entity. The access and mobility management function entity comprises a processor and a memory. The memory contains instructions executable by the processor. The access and mobility management function entity is operative to receive a message for starting a multicast/broadcast, MB, session from a session management function, SMF, entity, wherein the message comprises first location information. The access and mobility management function entity is further operative to send an MB session joining accept or reject or cancel message to at least one terminal device based on the first location information.

Another aspect of the present disclosure provides a terminal device. The terminal device comprises a processor and a memory. The memory contains instructions executable by the processor. The terminal device is operative to send a request for joining a multicast/broadcast, MB, session to an access and mobility management function, AMF, entity. The terminal device is further operative to receive a response for joining the MB session from the AMF entity.

In an embodiment, the response for joining the MB session comprises a result of accepting or rejecting the terminal device to join the MB session and the result is determined based on first location information.

Another aspect of the present disclosure provides a radio access network (RAN). The radio access network (RAN) comprises a processor and a memory. The memory contains instructions executable by the processor. The radio access network (RAN) is operative to receive, from an access and mobility management function, AMF, entity, a message for allocating at least one resource for a multicast/broadcast, MB, session. The message comprises first location information. The radio access network (RAN) is further operative to allocate at least one resource for the MB session based on the first location information.

Another aspect of the present disclosure provides a session management function entity. The session management function entity comprises a processor and a memory. The memory contains instructions executable by the processor. The session management function entity is operative to receive a request for starting a multicast/broadcast, MB, session from a multicast broadcast service function, MBSF, entity. The request comprises first location information. The session management function entity is further operative to send a message for starting the MB session to an access and mobility management function, AMF, entity, wherein the message comprises the first location information.

Another aspect of the present disclosure provides a multicast broadcast service function entity. The multicast broadcast service function entity comprises a processor and a memory. The memory contains instructions executable by the processor. The multicast broadcast service function entity is operative to receive a request for activating a multicast broadcast service, MBS, bearer from an application function, AF, entity, wherein the request for activating the MBS bearer comprises second location information. The multicast broadcast service function entity is further operative to translate the second location information to first location information. The multicast broadcast service function entity is further operative to send a request for starting a multicast/broadcast, MB, session to a session management function, SMF, entity, wherein the request for starting the MB session comprises the first location information.

Another aspect of the present disclosure provides an application function entity. The application function entity comprises a processor and a memory. The memory contains instructions executable by the processor. The application function entity is operative to determine to activate a multicast broadcast service, MBS, bearer. The application function entity is operative to send a request for activating the MBS bearer to a multicast broadcast service function, MBSF, entity, wherein the request for activating the MBS bearer comprises second location information.

Another aspect of the present disclosure provides a computer-readable storage medium storing instructions which, when executed on at least one processor, cause the at least one processor to carry out any of the methods according to the first to sixth aspects of the disclosure.

Another aspect of the present disclosure provides a computer program product comprising instructions which, when executed on at least one processor, cause the at least one processor to carry out any of the methods according to the first to sixth aspects of the disclosure.

Another aspect of the present disclosure provides a communication system including a host computer including: processing circuitry configured to provide user data; and a communication interface configured to forward the user data to a cellular network for transmission to a terminal device. The cellular network includes a network node such as radio access network (RAN) above mentioned, and/or the terminal device is above mentioned.

In embodiments of the present disclosure, the system further includes the terminal device, wherein the terminal device is configured to communicate with the network node.

In embodiments of the present disclosure, the processing circuitry of the host computer is configured to execute a host application, thereby providing the user data; and the terminal device includes processing circuitry configured to execute a client application associated with the host application.

Another aspect of the present disclosure provides a communication system including a host computer including: a communication interface configured to receive user data originating from a transmission from a terminal device; a network node. The transmission is from the terminal device to the network node. The network node such as radio access network (RAN) is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

Another aspect of the present disclosure provides a method implemented in a communication system which may include a host computer, a network node and a UE. The method may comprise providing user data at the host computer. Optionally, the method may comprise, at the host computer, initiating a transmission carrying the user data to the UE via a cellular network comprising the network node which may perform any step of the method according to the third aspect of the present disclosure.

Another aspect of the present disclosure provides a communication system including a host computer. The host computer may comprise processing circuitry configured to provide user data, and a communication interface configured to forward the user data to a cellular network for transmission to a UE. The cellular network may comprise a network node having a radio interface and processing circuitry. The network node's processing circuitry may be configured to perform any step of the methods according to the third aspect of the present disclosure.

Another aspect of the present disclosure provides a method implemented in a communication system which may include a host computer, a network node and a UE. The method may comprise providing user data at the host computer. Optionally, the method may comprise, at the host computer, initiating a transmission carrying the user data to the UE via a cellular network comprising the network node. The UE may perform any step of the method according to the second aspect of the present disclosure.

Another aspect of the present disclosure provides a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the second aspect of the present disclosure.

Another aspect of the present disclosure provides a method implemented in a communication system which may include a host computer, a network node and a UE. The method may comprise, at the host computer, receiving user data transmitted to the network node from the UE which may perform any step of the method according to the second aspect of the present disclosure.

Another aspect of the present disclosure provides a communication system including a host computer. The host computer may comprise a communication interface configured to receive user data originating from a transmission from a UE to a network node. The UE may comprise a radio interface and processing circuitry. The UE's processing circuitry may be configured to perform any step of the method according to the second aspect of the present disclosure.

Another aspect of the present disclosure provides a method implemented in a communication system which may include a host computer, a network node and a UE. The method may comprise, at the host computer, receiving, from the network node, user data originating from a transmission which the network node has received from the UE. The network node may perform any step of the methods according to the third aspect of the present disclosure.

Another aspect of the present disclosure provides a communication system which may include a host computer. The host computer may comprise a communication interface configured to receive user data originating from a transmission from a UE to a network node. The network node may comprise a radio interface and processing circuitry. The network node's processing circuitry may be configured to perform any step of the methods according to the third aspect of the present disclosure.

BRIEF DESCRIPTION OF DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 7e shows a flowchart of a method according to another embodiment of the present disclosure;

FIG. 7h shows a flowchart of a method according to another embodiment of the present disclosure;

FIG. 7j shows a flowchart of a method according to another embodiment of the present disclosure;

FIG. 7k shows a flowchart of a method according to another embodiment of the present disclosure;

DETAILED DESCRIPTION

Figure 1:
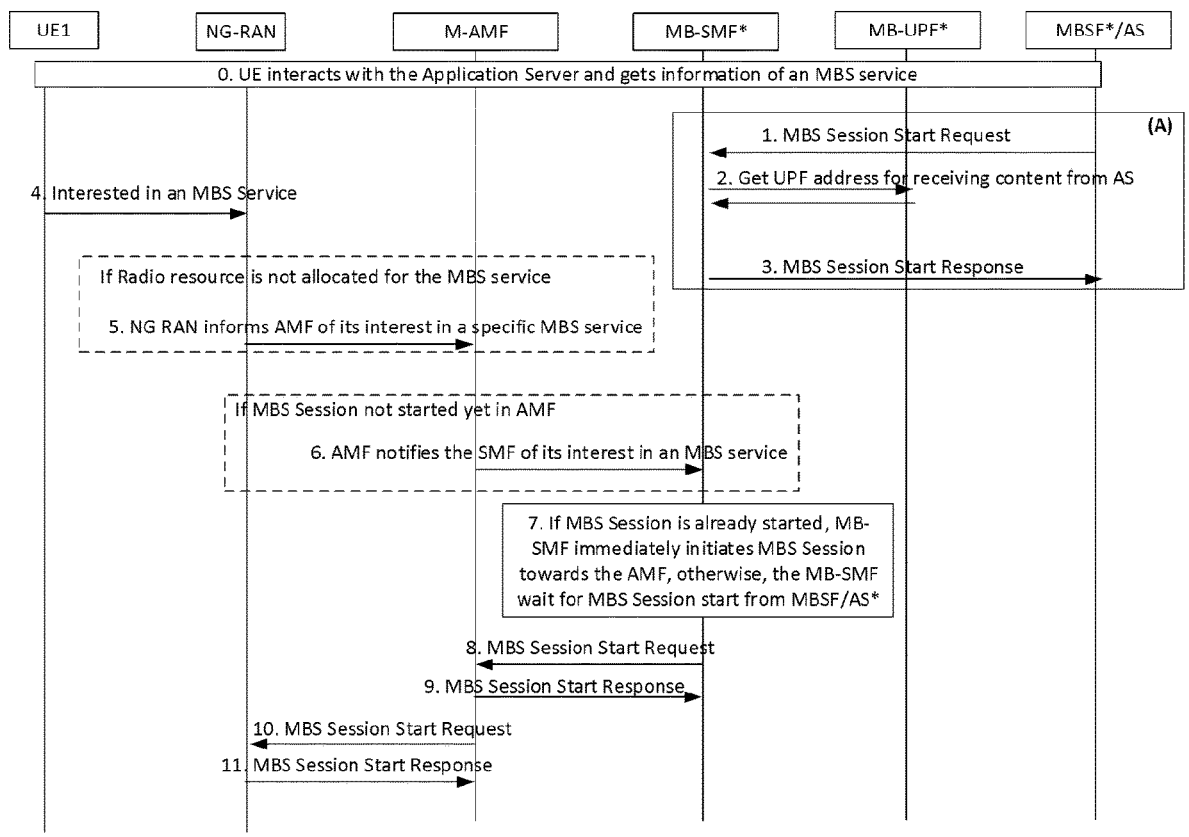
FIG. 1 illustrates an example from FIG. 6.2.2.1-1 of TR 23.757 V0.3.0.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP) or the wired communication protocols. For example, the wireless communication protocols may comprise the first generation (1G), 2G, 3G, 4G, 4.5G, 5G communication protocols, and/or any other protocols either currently known or to be developed in the future.

The term "radio access network (RAN)" refers to a network device with accessing function in a communication network via which a terminal device accesses to the network and receives services therefrom. The network node may include a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), an Integrated Access and Backhaul (IAB) node, a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

As used herein, the "radio access network (RAN)" may be any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Note that, in the description herein, reference may be made to the term "cell"; however, particularly with respect to 5G NR concepts, beams may be used instead of cells and, as such, it is important to note that the concepts described herein are equally applicable to both cells and beams.

As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL, transmission refers to a transmission from a network device to a terminal device, and an uplink, UL, transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that some embodiments of the present disclosure are mainly described in relation to the cellular network as defined by 3GPP being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies such as wireless sensor network may equally be utilized as long as exemplary embodiments described herein are applicable.

As used herein, MBS (Multicast Broadcast Services), when used as a prefix, the MBS is sometimes used equivalent with MB.

As used herein, MB (Multicast Broadcast) may refer to Unicast Communication over a point-to-point communication channel As used herein, multicast may refer to communication to a group of receivers who has announced their interest in the communication. Thereby the sender knows where the receivers are located.

As used herein, broadcast may refer to communication to a group of receivers. The sender does typically don't know where the receivers are located or how many they are. Therefore transmission is typically done towards pre-configured areas.

Multicast/Broadcast (MB) services (MBS) are so far not supported on 5G NR. With the enhanced characteristics of 5G NR e.g. short delays, bandwidth, etc., it is believed that Mission Critical Services (e.g., Mission Critical Push To Talk (MCPTT), Mission Critical Data (MCData), and Mission Critical Video (MCVideo)), as well as V2X services, will show an enhanced and much better performance on 5G NR.

Now a description of some solutions disclosed herein are provided. While described separated, one or more of these solutions or the particular embodiments or aspects of these solutions can be used in combination.

For 5G MBS Multicast support, the 5G System (5GS) may support UEs joining multicast groups. 5G Multicast Broadcast Sessions (referred to as "5G MB Sessions" or sometimes as "MB Sessions", "MBS Sessions", or MBS Bearers) may also be possible to be started, i.e. transmission of data or media to the group of UEs is started. 3GPP TS 23.246 V16.1.0 clause 8.2 describes "MBMS Multicast Service Activation" and 3GPP TS 23.246 V16.1.0 clause 8.3 describes "MBMS Session Start Procedure".

Figure 6:
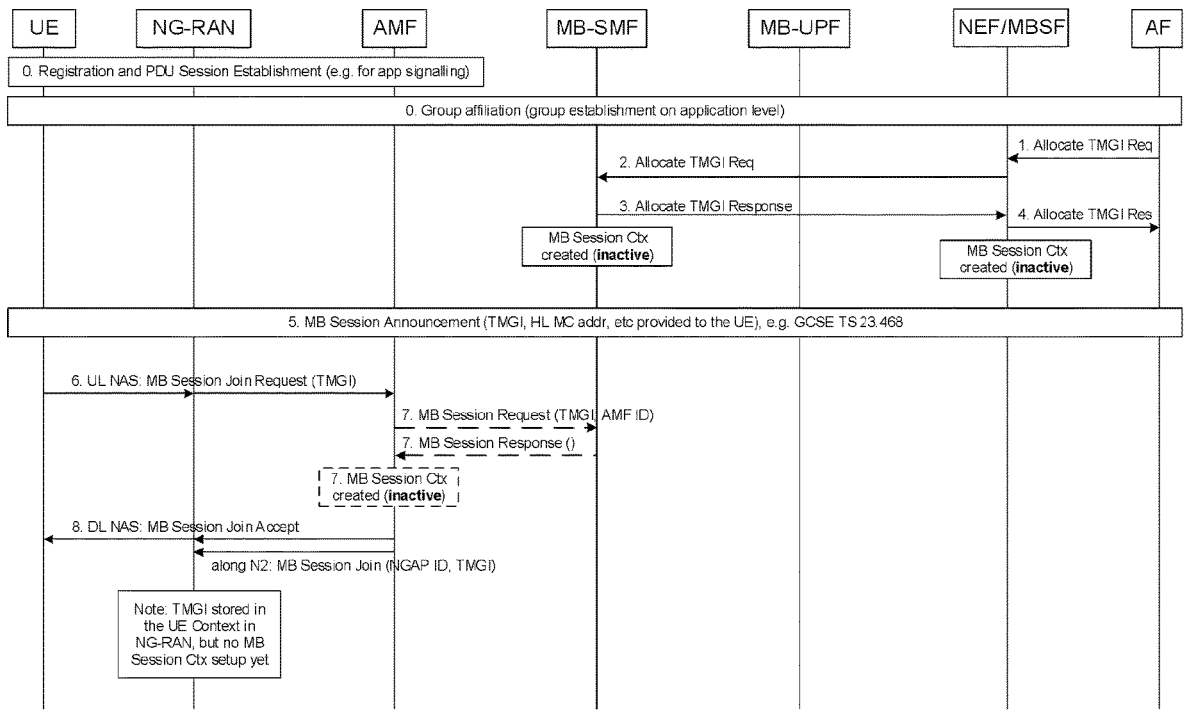
FIG. 6 shows an example of a MB session join procedure according to an embodiment of the disclosure.

Tentative proposals on Join and Session Start are outlined in 3GPP TR 23.757 V0.3.0, see e.g. FIG. 6.2.2.1-1, FIG. 6.3.2-1, FIG. 6.4.2.2-1, FIG. 6.6.2.1-1, etc. of 3GPP TR 23.757 V0.3.0. FIG.1 illustrates an example from FIG. 6.2.2.1-1 of TR 23.757 V0.3.0. The following description is from 3GPP TR 23.757 V0.3.0, where editorial comments and notes made herein are denoted by bracketed text.

NOTE 1: Procedure (A) can happen prior to, in parallel with, or after Steps 0, 4, 5 and 6. MBS service related configuration (e.g., TMGI allocation) occurs prior UE starting MBS service setup towards 5GS.

Editor's Note: How the TMGI is provided to the UE is FFS (e.g. from the AF, via PCF etc.).

0. UE interacted with the Application Server, and the MBS Session will be started some time later.
1. The Application Server starts MBS Session.
2. The MB-SMF requests the MB-UPF to allocate IP address and port for receiving downlink traffic. The MB-SMF also requests MB-UPF to allocate the multicast address and C-TEID if the multicast address and C-TEID allocation is done by the MB-UPF.
3. The MB-SMF responds to the Application Server with the IP address and port which the AS can send packets to.
4. The UE notifies the NG-RAN that the UE is interested in a specific MBS service represented by TMGI.

Editor's Note: It is FFS whether UE expresses interest in a specific MBS service unconditionally (i.e., even if radio resources for this specific MBS service have already been allocated or even when the UE is in an area where the MBS service is not available). Whether RRC signalling can be used by UE to express interest in a specific MBS service depends on work in RAN WGs.

5. No radio resource has been allocated for the MBS service, and the NG-RAN notifies the M-AMF of its interest. If radio resource has been allocated, step 5 to step 11 are skipped.
6. The MBS Session for the MBS service is not started yet in the M-AMF, and the M-AMF stores the info that NG-RAN has interest in a specific MBS service and notifies the SMF of its interest in an MBS Service. If the MBS session has been started in the M-AMF, step 6 to step 9 are skipped.

Editor's Note: How the M-AMF discovers the MB-SMF is FFS.

Editor's Note: A check whether the UE is authorized to access the MBS service is FFS.

7. If the MBS Session is already started, the MB-SMF immediately initiates the MBS Session towards the M-AMF, otherwise, the MB-SMF wait for the MBS Session start from MBSF/AF and then initiates MBS Session towards the M-AMF.

8-9. MB-SMF initiates the MBS Session Start Request towards the M-AMF including the multicast address and C-TEID.

10-11. The M-AMF sends the MBS Session Request also to the NG-RAN.

Figure 2:
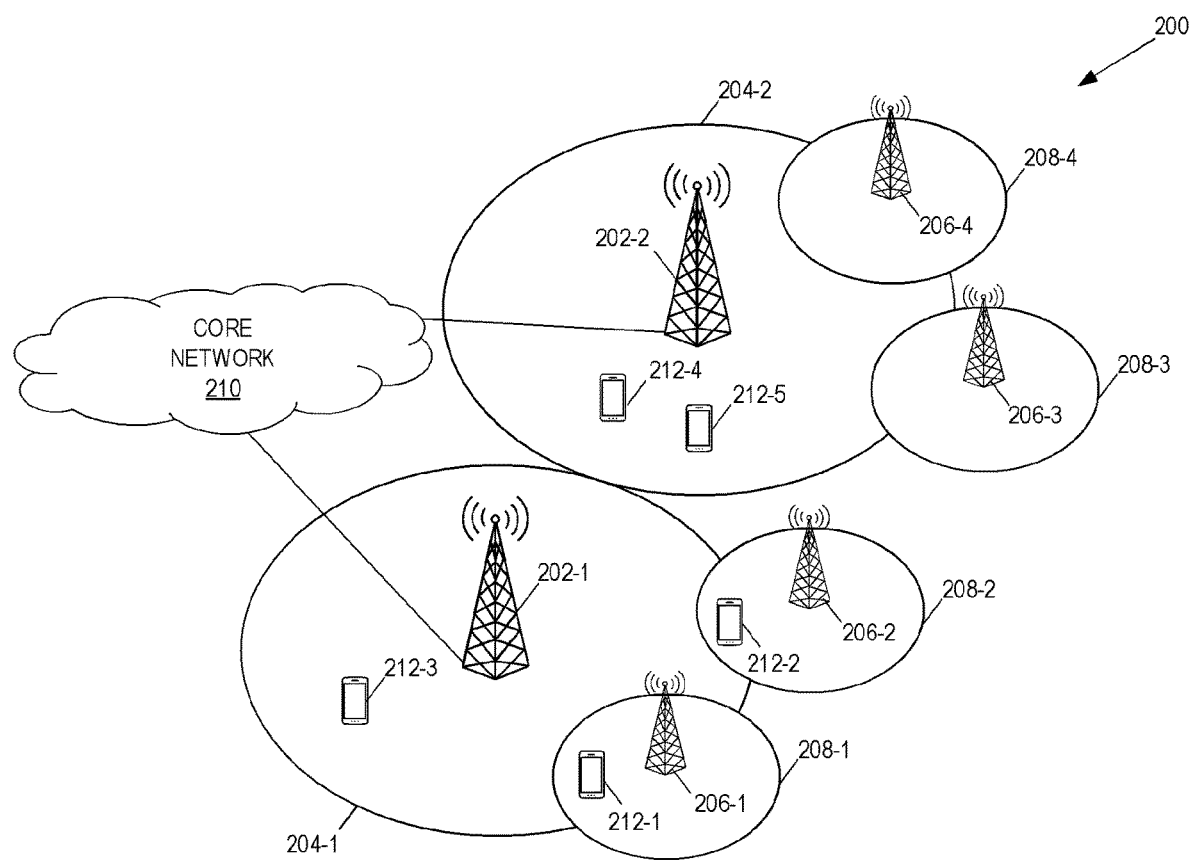
FIG. 2 illustrates one example of a cellular communications system in which embodiments of the present disclosure may be implemented.

FIG. 2 illustrates one example of a cellular communications system 200 in which embodiments of the present disclosure may be implemented. In the embodiments described herein, the cellular communications system 200 is a 5G System (5GS) including a Next Generation RAN (NG-RAN) and a 5G Core (5GC). In this example, the RAN includes base stations 202-1 and 202-2, which in the 5GS include NR base stations (gNBs) and optionally next generation eNBs (ng-eNBs) (i.e., LTE RAN nodes connected to the 5GC), controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5G Core (5GC). The base stations 202 (and optionally the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as wireless communication device 212. In the following description, the wireless communication devices 212 are oftentimes UEs, but the present disclosure is not limited thereto.

Figure 3:
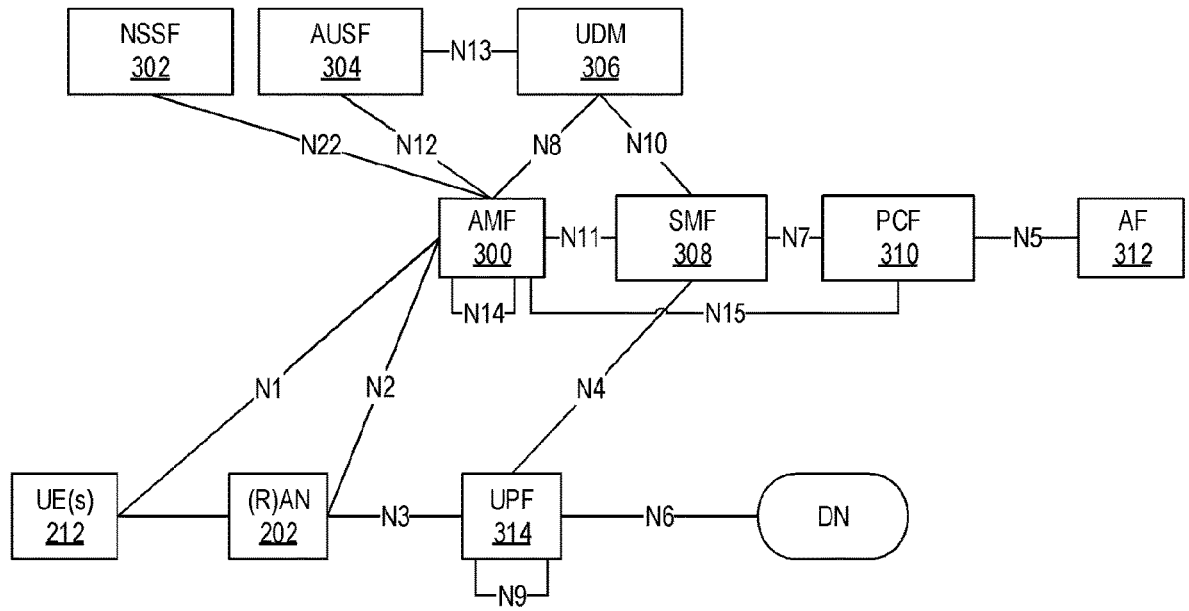
FIG. 3 illustrates a wireless communication system represented as a 5G network architecture.

FIG. 3 illustrates a wireless communication system represented as a 5G network architecture composed of core Network Functions (NFs), where interaction between any two NFs is represented by a point-to-point reference point/interface. FIG. 3 can be viewed as one particular implementation of the system 200 of FIG. 2.

Seen from the access side the 5G network architecture shown in FIG. 3 comprises a plurality of UEs 212 connected to either a RAN 202 or an Access Network (AN) as well as an AMF 300. Typically, the R(AN) 202 comprises base stations, e.g. such as eNBs or gNBs or similar. Seen from the core network side, the 5GC NFs shown in FIG. 3 include a NSSF 302, an AUSF 304, a UDM 306, the AMF 300, a SMF 308, a PCF 310, and an Application Function (AF) 312.

Reference point representations of the 5G network architecture are used to develop detailed call flows in the normative standardization. The N1 reference point is defined to carry signaling between the UE 212 and AMF 300. The reference points for connecting between the AN 202 and AMF 300 and between the AN 202 and UPF 314 are defined as N2 and N3, respectively. There is a reference point, N11, between the AMF 300 and SMF 308, which implies that the SMF 308 is at least partly controlled by the AMF 300. N4 is used by the SMF 308 and UPF 314 so that the UPF 314 can be set using the control signal generated by the SMF 308, and the UPF 314 can report its state to the SMF 308. N9 is the reference point for the connection between different UPFs 314, and N14 is the reference point connecting between different AMFs 300, respectively. N15 and N7 are defined since the PCF 310 applies policy to the AMF 300 and SMF 308, respectively. N12 is required for the AMF 300 to perform authentication of the UE 212. N8 and N10 are defined because the subscription data of the UE 212 is required for the AMF 300 and SMF 308.

The 5GC network aims at separating UP and CP. The UP carries user traffic while the CP carries signaling in the network. In FIG. 3, the UPF 314 is in the UP and all other NFs, i.e., the AMF 300, SMF 308, PCF 310, AF 312, NSSF 302, AUSF 304, and UDM 306, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 300 and SMF 308 are independent functions in the CP. Separated AMF 300 and SMF 308 allow independent evolution and scaling. Other CP functions like the PCF 310 and AUSF 304 can be separated as shown in FIG. 3. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 4:
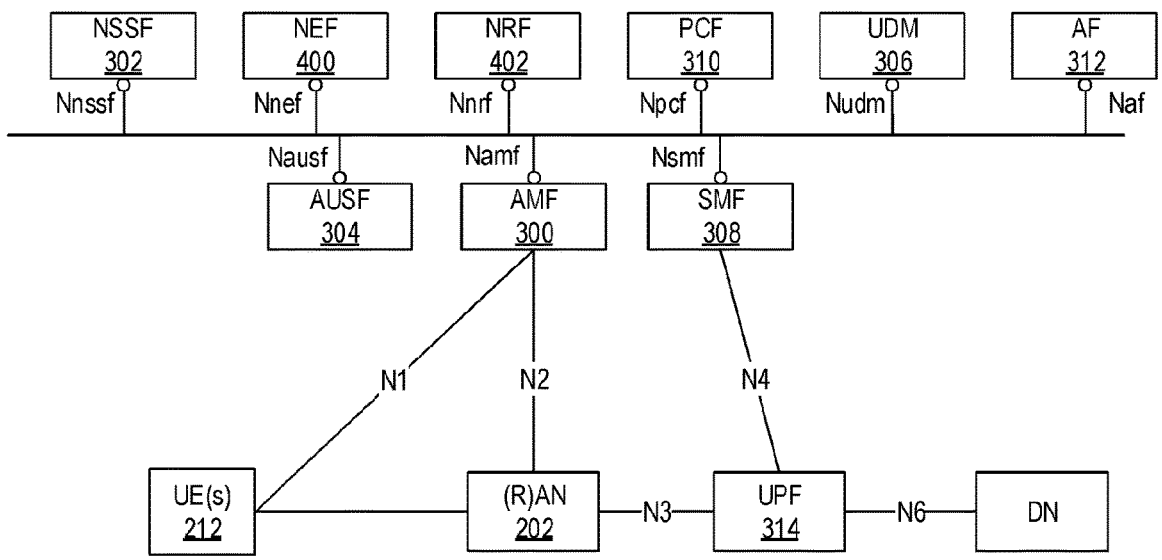
FIG. 4 illustrates a 5G network architecture using service-based interfaces between the NFs in the CP.

FIG. 4 illustrates a 5G network architecture using service-based interfaces between the NFs in the CP, instead of the point-to-point reference points/interfaces used in the 5G network architecture of FIG. 3. However, the NFs described above with reference to FIG. 3 correspond to the NFs shown in FIG. 4. The service(s) etc. that a NF provides to other authorized NFs can be exposed to the authorized NFs through the service-based interface. In FIG. 4 the service based interfaces are indicated by the letter "N" followed by the name of the NF, e.g. Namf for the service based interface of the AMF 300 and Nsmf for the service based interface of the SMF 308, etc. The NEF 400 and the NRF 402 in FIG. 4 are not shown in FIG. 3 discussed above. However, it should be clarified that all NFs depicted in FIG. 3 can interact with the NEF 400 and the NRF 402 of FIG. 4 as necessary, though not explicitly indicated in FIG. 3.

Some properties of the NFs shown in FIGS. 3 and 4 may be described in the following manner. The AMF 300 provides UE-based authentication, authorization, mobility management, etc. A UE 212 even using multiple access technologies is basically connected to a single AMF 300 because the AMF 300 is independent of the access technologies. The SMF 308 is responsible for session management and allocates Internet Protocol (IP) addresses to UEs. It also selects and controls the UPF 314 for data transfer. If a UE 212 has multiple sessions, different SMFs 308 may be allocated to each session to manage them individually and possibly provide different functionalities per session. The AF 312 provides information on the packet flow to the PCF 310 responsible for policy control in order to support QoS. Based on the information, the PCF 310 determines policies about mobility and session management to make the AMF 300 and SMF 308 operate properly. The AUSF 304 supports authentication function for UEs or similar and thus stores data for authentication of UEs or similar while the UDM 306 stores subscription data of the UE 212. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 5A:
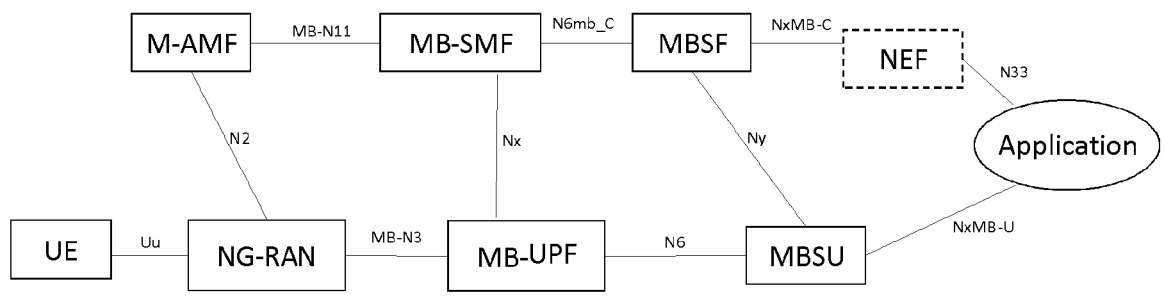
FIG. 5a shows an example of 5GS Architecture supporting MBS according to an embodiment of the disclosure.

FIG. 5a shows an example of 5GS Architecture supporting MBS according to an embodiment. FIG. 5a is same as FIG. A.2.2-1 of 3GPP TR 23.757 V0.3.0.

The following description is from 3GPP TR 23.757 V0.3.0, where editorial comments and notes made herein are denoted by bracketed text.

Editor's note: MB-SMF and MB-UPF, M-AMF, MBSF and MBSU are functional components, whether to introduce standalone entities or reuse existing entities to cater for the functions is FFS.

Editor's note:

EPC supports various different SGi-mb options for eMBMS. The selection of one or more N6 options for MBS is FFS.

To support MBS in 5GS user service delivery, two variants exist: one for Transport Only Mode, and the other for Full Service Mode as defined in TS 23.246 [4] clause 7.5.

Editor's note: These two services modes need to be mapped to 5GS MBS context.

Editor's note: whether MBSU should be involved for Transport Only Mode is FFS.

Enhancement to Existing Entities and New Functional Components are as Follows:

UE, NG-RAN and M-AMF are enhanced to support MBS.

MB-SMF (Multicast/Broadcast Session Management Function) and MB-UPF (Multicast/Broadcast User Plane Function) are new functional components in 5GS.

MBSF (Multicast/Broadcast Service Function) is a new Network Function to handle signalling part to cater for the service layer capability in the Transport-Only and the Full Service Mode. It also provides an interface to the Application Server or content provider in the Transport Only mode.

MBSU (Multicast/Broadcast Service User plane) is new entity to handle the payload part to cater for the service layer capability.

NEF is an existing NF, the role/functions associated with NEF is FFS.

PCF may be enhanced, further details FFS.

Enhancement to Existing Interfaces and New Interfaces are as Follows:

Uu interface

Editor's note: Whether Uu interface is impacted depends on RAN evaluation.

N2 interface is impacted to handle MBS Session.

N6 interface supports the MBS user plane.

MB-N11, implemented as NF Services.

MB-N3.

Nx.

Editor's note: Whether to enhance existing N4, N3 and N11 or to introduce a new interfaces depends on the discussion whether standalone MB-SMF and MB-UPF are to be introduced.

Ny: new (optional) interface between the new MBSF and MBSU to provide the service layer capability in Full Service Mode.

N6mb-C: new interface between the new MBSF and MB-SMF, implemented as NF Services.

NxMB-C and NxMB-U: new interface between the new MBSF/MBSU and NEF. NxMB-C is implemented as NF Services.

The difference between transport only and full service mode of operation relies on the transparent delivery of the MBS service via 3GPP networks.

Editor's note: Impacts and functional distribution difference between the two modes of operation is FFS.

Figure 5B:
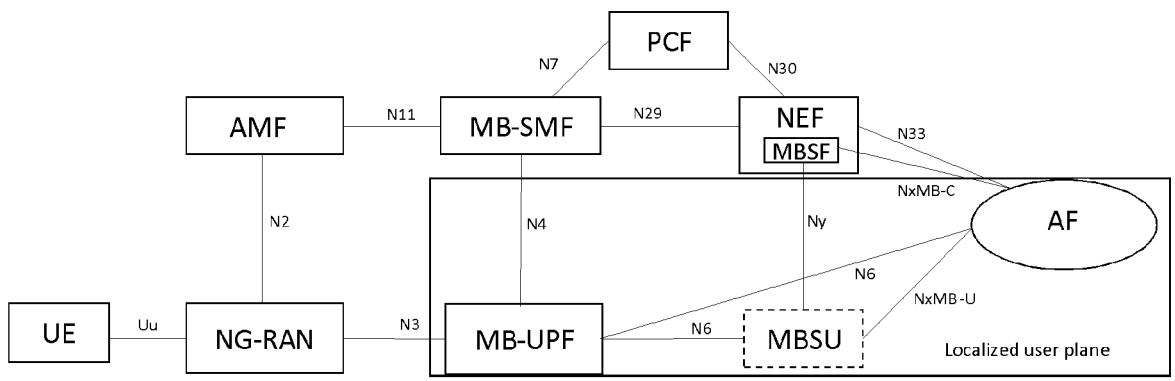
FIG. 5b shows an example of 5GS Architecture supporting MBS according to another embodiment of the disclosure.

FIG. 5b shows an example of 5GS Architecture supporting MBS according to another embodiment. FIG. 5b is similar to FIG. 5a except that MBSF is included in NEF, PCF is shown in FIG. 5b and some interface names are different.

Some solution according to some embodiments can address Issue #6: Local MBS service of 3GPP TR 23.757 V0.3.0. Some solution according to some embodiments enhances the existing 5MBS (5G MBS) architecture to provide local MBS service.

In an embodiment, for V2X, public safety services, the service discovery is handled between UE and AF in unicast manner, while the service delivery is handled in an MBS specific way. The service discovery of local MBS service can be addressed in 3GPP TR 23.748 V0.3.0 "Study on enhancement of support for Edge Computing in 5G Core network (5GC)", the disclosure of which is incorporated by reference herein in its entirety.

In an embodiment, Local MBS service requires the service to be delivered in a local service area for a specific period. All the relevant UEs in the local area can receive the MBS service. When starting a local MBS service, the application function needs to be able to provide the local service area to 5GC and NG-RAN to ensure the local MB service can be delivered within some certain areas. The UEs outside those areas may not be served for the local MBS service.

In an embodiment, to offer local MBS service, the backhaul delay between 5GC and NG-RAN needs to be minimized. To minimize the delivery latency, it is essential to have localized user plane deployment to work together with localized application function. MB-UPF (and optional MBSU) and local application function needs to be deployed localized to be close to NG-RAN.

NOTE: The message names in the procedures as described in the description are descriptive. It is assumed that the names are updated with corresponding SBI based names where applicable during the normative phase. N2, N3 messages are dependent on RAN3 decisions.

FIG. 6 shows an example of a MB session join procedure according to an embodiment of the disclosure.

The MB session Join procedure may be used by UEs to inform the 3GPP network of the UE interest in an MB session. During the session Join procedure, the distribution area of the multicast session is adjusted if needed. As such, the session Join procedure together with other procedures, e.g. session leave procedure and handover procedure, enables the dynamic and efficient use of radio resources.

At step 0. The UE registers and a PDU (protocol data unit) Session is established. The UE and the AF uses the PDU Session e.g. to signal and establish a group on application level (see TS 23.468 V15.1.0, the disclosure of which is incorporated by reference herein in its entirety).

At step 1. AF sends Allocate TMGI (Temporary Mobile Group Identity) Request message to NEF/MBSF to request allocation of a TMGI to identify a new group.

At step 2. NEF/MBSF selects based on local configuration an MB-SMF (if there are multiple) to handle the group and sends an Allocate TMGI Request message to the MB-SMF. Optionally, the MBSF makes the TMGI allocation, stores in the MB Session Ctx (Context) and includes the allocated TMGI in the message to the MB-SMF. The MBSF may have a pre-configured TMGI range for each MB-SMF. The TMGI range may also be configured/registered in the NRF to allow AMFs to discover which MB-SMF is controlling an MB Session identified by a TMGI.

At step 3. MB-SMF allocates a TMGI, a Lower Layer Multicast IP Address (LL MC addr), and N6 tunnel information and stores the information in a new MB Session Ctx set to 'inactive' state. MB-SMF returns the TMGI and the N6 tunnel information to the NEF/MBSF. If MB-SMF makes the TMGI allocation, it may e.g. allocate a TMGI from a pre-configured TMGI range.

NOTE: For large networks or for redundancy reasons, the NEF/MBSF might use multiple MB-SMFs (and MB-UPFs).

At step 4. The NEF/MBSF establishes a new MB Session Ctx set to 'inactive' state, stores received information and responds to the AF by sending an Allocate TMGI Response (TMGI) message.

At step 5. MB Session Announcement (see e.g. TS 23.468). The AF informs the members in the group of various group info e.g. TMGI, HL MC address (addr). The HL MC address may be allocated by the AF for the group/TMGI.

At step 6. UE indicates its interest to join an MB Session by sending an UL NAS MB Session Join Request (TMGI) message. NG-RAN forwards the NAS message to the AMF. The AMF stores the TMGI in its UE Context.

At step 7. If the AMF does not already have a MB Session Ctx for the received TMGI (in step 6), the AMF selects an MB-SMF for the TMGI by querying the NRF. A MB Session Request (TMGI, AMF ID) message is sent to the MB-SMF to announce the AMF's interest in the MB Session. When the MB-SMF has returned a MB Session Response message, the AMF creates a MB Session Ctx in 'inactive' state for the TMGI.

At step 8. The AMF stores the TMGI and the NG-RAN ID of the originating node of the N2 message in step 6 in the AMF MB Session Ctx. The AMF creates a DL NAS MB Session Join Response message and piggy backs that on an N2 MB Session Join (NGAP (Next Generation Application Protocol) ID (identifier), TMGI) message. The NG-RAN stores the TMGI in the UE context in NG-RAN.

NOTE: NG-RAN does only keep active MB Session Ctxs, i.e. created during Session Start procedures.

NOTE: The primary purpose of the MB Session Ctx in the AMF is for the AMF to be able to manage forwarding of Session Start messages to NG-RAN nodes where members of the group are camping and to initiate Group paging for CM (Connection Management)-IDLE group members.

Figure 7A:
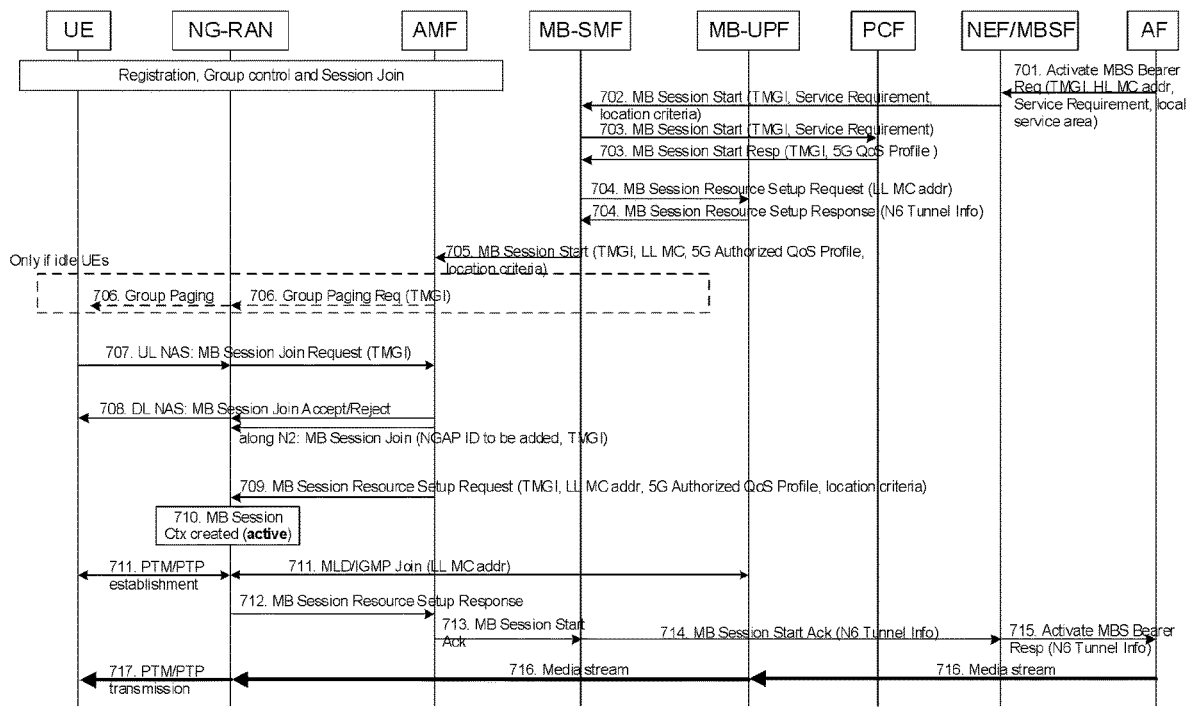
FIG. 7a shows a flowchart of a procedure of local MBS service delivery according to an embodiment of the present disclosure.

FIG. 7a shows a flowchart of a procedure of local MBS service delivery according to an embodiment of the present disclosure.

Step 701: To activate a local MBS Bearer, AF includes local service area information in the Activate MBS Bearer Request and sent it to NEF/MBSF. For example, the AF requests activation of an MB Session by sending an Activate MBS Bearer Request (TMGI, HL MC addr, Service Requirement, local service area information) message to the NEF/MBSF. AF has allocated a Higher Layer IP Multicast Address (HL MC addr). Service Requirement for the MB Session may be included in the Activate MBS Bearer Request. The local service area information may be included in the Activate MBS Bearer Request.

Step 702: NEF/MBSF translates the local service area information to location criteria as specified in 3GPP TS 23.503 V16.4.1, includes the location criteria in an MB Session Start Request and send it to MB-SMF. For example, the NEF/MBSF checks if the input parameters e.g. HL MC addr are valid. NEF/MBSF sets the MB Session Ctx to active. NEF/MBSF translates the local service area information to location criteria. NEF/MBSF sends a MB Session Start (TMGI, Service Requirement, local service area information) message to the MB-SMF.

In an embodiment, NEF/MBSF may translate the local service area information to at least one other location information such as Registration Area, SMF Service Area and UPF service area and this translated information can be added into the MB Session Start Request.

Step 703: MB-SMF contacts PCF for 5MBS policy control. For example, MB-SMF sends the TMGI for the MB Session and the Service Requirement to the PCF. The PCF returns a 5G QoS Profile, which the MB-SMF uses as the 5G Authorized QoS Profile for the MB Session.

Step 704: Based on the location criteria information, MB-SMF selects the localized MB-UPF to set up the resources for the MB session. For example, MB-SMF sets up the N6 resources for the MB Session in the MB-UPF and the N3 resources for transport multicast tunnelling using the LL MC address allocated for the TMGI. Optionally media reception in MB-UPF is untunnelled, in which case the MB-SMF also provides the HL MC addr so that the MB-UPF can send and receive the (untunneled) IP Multicast Media stream. If N6 tunneling is used, the MB-UPF allocates N6 tunnel information (e.g. UDP port and IP (internet protocol) address) and returns to the MB-SMF. MB-SMF stores the received information (info) in the MB Session Ctx.

Step 705: MB-SMF sends MB Session Start messages to at least one AMF that has earlier joined the MB Session with the location criteria information. For example, MB-SMF sets the MB Session Ctx to active and sends MB Session Start (TMGI, LL MC addr, 5G Authorized QoS Profile, the location criteria information) messages to all AMFs that have earlier joined the MB Session. When the AMF receives the MB Session Start message, AMF sets its MB Session Ctx to active state.

Step 706: (optional): AMF performs group paging for those CM-IDLE UEs that have joined the MB Session. For example, if the AMF has CM-IDLE UEs that have joined the MB Session, the AMF performs group paging including the Group Paging Identity (TMGI) in the Paging message in the registration areas of the CM-IDLE UEs. The NG-RAN node triggers group paging.

Steps 707~708: the UE respond to the Group paging e.g. by sending UL NAS (Non-Access Stratum) MB Session Join Request (TMGI) to AMF. When AMF receives MB Session Join Request, AMF checks whether the UE meets the location criteria (if available) of the local MBS service and sends DL NAS MB Session Join Accept/Reject to the UE. If the UE does not meet the Location criteria, AMF may reject the MB Session Join. Along with that NAS message, AMF also sends an N2 message: MB Session Join (NGAP ID to be added, TMGI). NG-RAN may remove the UE from the MB Session Context, so that NG-RAN will not deliver the MB Session data to this UE. For other UEs within the coverage of the service area defined by location criteria, they may be served by NG-RAN and 5GC for the MB Session data delivery.

Step 709: AMF include the location criteria in the MB Session Resource Setup Request to the relevant RAN nodes, which have received N2 MB Session Join message from the AMF. For example, the AMF sends a MB Session Resource Setup Request (TMGI, LL MC, 5G Authorized QoS Profile, location criteria) message to all RAN nodes where CM-CONNECTED UEs that has joined the TMGI resides.

Step 710: NG-RAN creates MB Session Context. For example, NG-RAN creates a MB Session Ctx (if it not already exists), sets it to 'active' state, stores the TMGI, the QoS Profile, location criteria and a list of AMF IDs in the MB Session Ctx.

Step 711: NG-RAN node(s) follows the location criteria of the local MBS service to establish the downlink resource. For example, the NG-RAN joins the multicast group (i.e. LL MC addr) and follows the location criteria of the local MBS service to establish PTM or PTP DL resources for the MB Session. If there are UEs in CM-Connected with RRC_I-NACTIVE state with the TMGI in their UE Contexts, NG-RAN performs the Network triggered transition from RRC_INACTIVE to RRC_CONNECTED procedure for those UEs.

Steps 712~715: MB Session Resource Setup Response from the downlink nodes to the uplink nodes. For example, the NG-RAN reports successful establishment of the MB Session resources by sending MB Session Resource Setup Response (TMGI) message(s) to the AMF. The AMF sends MB Session Start Ack (TMGI) to the MB-SMF. The AMF may send an Ack for each response it receives from NG-RAN nodes (e.g. useful for small MCPTT areas). That is, steps 713 to 715 may be repeated multiple times (once for each involved NG-RAN node). The AMF may also use an upper limit for the number of Acks sent and fallback to aggregated Acks if NG-RAN Acks go beyond the limit (to reduce signaling load). That is, collect status from all or a number of downstream nodes (with time out) and then make an aggregated report. The MB-SMF sends the MB Session Start Ack (TMGI) message to the NEF/MBSF. N6 Tunnel info is included in the response if not already provided to the AF. The NEF/MBSF sends an Activate MBS Bearer Response including the N6 Tunnel Info to the AF.

Steps 716~717: Media delivery from AF to UE. The NG-RAN is able to select PTP (point-to-point) or PTM (point-to-multipoint) bearers that are used for multicast data transmission to UEs. For example, the MB Session is now active. The AF starts transmitting the DL media stream using the N6 Tunnel Info, or optionally untunneled i.e. as an IP multicast stream using the HL MC address. The NG-RAN transmits the received DL media stream using DL PTM or PTP resources.

Figure 7B:
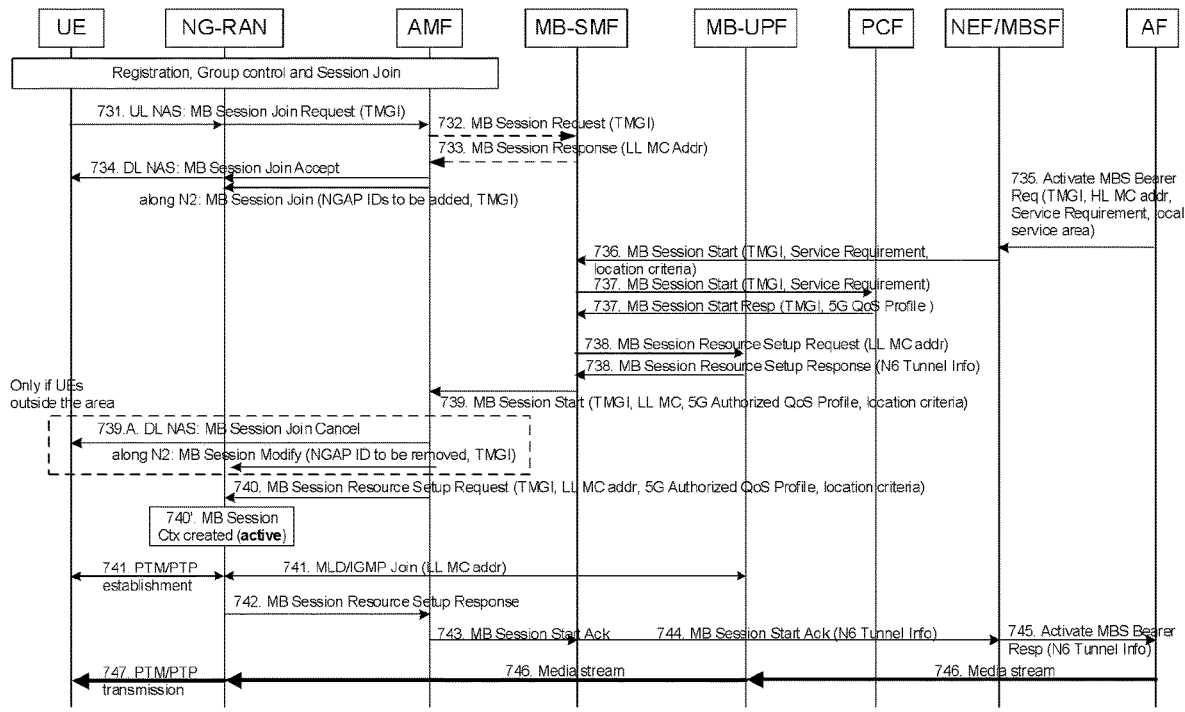
FIG. 7b shows a flowchart of a procedure of local MBS service delivery according to another embodiment of the present disclosure.

FIG. 7b shows a flowchart of a procedure of local MBS service delivery according to another embodiment of the present disclosure. For some parts which have been described in the above embodiments, detailed description thereof is omitted here for brevity.

Step 731: UE send an MB Session Join Request (TMGI) to AMF.

Steps 732~733: AMF does not have MB Session context, it queries the context from MB-SMF by sending an MB Session Request (TMGI) to MB-SMF and receiving an MB Session Response (LL MC Addr) from MB-SMF. At this stage, the session hasn't been started. The details of the session are not ready.

Step 734: AMF responds MB Session Join Accept to UE, along with an N2 message: MB Session Join (NGAP IDs to be added, TMGI) to NG-RAN.

Step 735: To activate a local MBS Bearer, AF includes the local service area information in the Activate MBS Bearer Request to NEF.

Step 736: NEF/MBSF translates the local service area to location criteria, and includes the location criteria in MB Session Start Request to MB-SMF Step 737: MB-SMF contacts PCF for 5MBS policy control.

Step 738: Based on the location criteria information, MB-SMF selects the localized MB-UPF to set up the resources.

Step 739: MB-SMF sends MB Session Start messages to all AMFs that has earlier joined the MB Session with the location criteria information.

Steps 735-739 are same as step 701-705 of FIG. 7a.

Step 739.A: In case AMF detects some UE previously joined are out of the service area defined by location criteria, it sends MB Session Join Cancel to those UEs, so that UEs will know they will not be served the MB Session. Along with that NAS message, AMF also sends an N2 message: MB Session Modify (NGAP ID to be removed, TMGI). NG-RAN will remove the UE(s) from the MB Session Context, so that NG-RAN will not deliver the MB Session data to the UE(s). For other UEs within the coverage of the service area defined by location criteria, they will be served by NG-RAN and 5GC for the MB Session data delivery.

Step 740: AMF includes the location criteria in the MB Session Resource Setup Request to the relevant RAN nodes, which have received N2 MB Session Join message from the AMF.

Step 741: RAN nodes follows the location criteria of the local MBS service to establish the downlink resource.

Steps 742~745: Acknowledge from the downlink nodes to the uplink nodes

Steps 746~747: media delivery from AF to UE.

Steps 740-747 are same as steps 709-716 of FIG. 7a.

There may be some impacts for some network function entity. For example, the NEF translates the received local service area information to location criteria, and includes the location criteria in MB Session Start request for local MBS service. The MB-SMF selects local MB-UPF based on location criteria. The MB-SMF includes the location criteria in MB Session Start Request to AMF for local MBS service. The AMF checks whether the UE meet the location criteria, and accept/reject MB Session Join Request from UE. The AMF includes the location criteria in MB Session Resource Setup Request to the relevant RAN nodes. NG-RAN follows the location criteria of the local MBS service to establish the UP/DL resources.

Figure 7C:
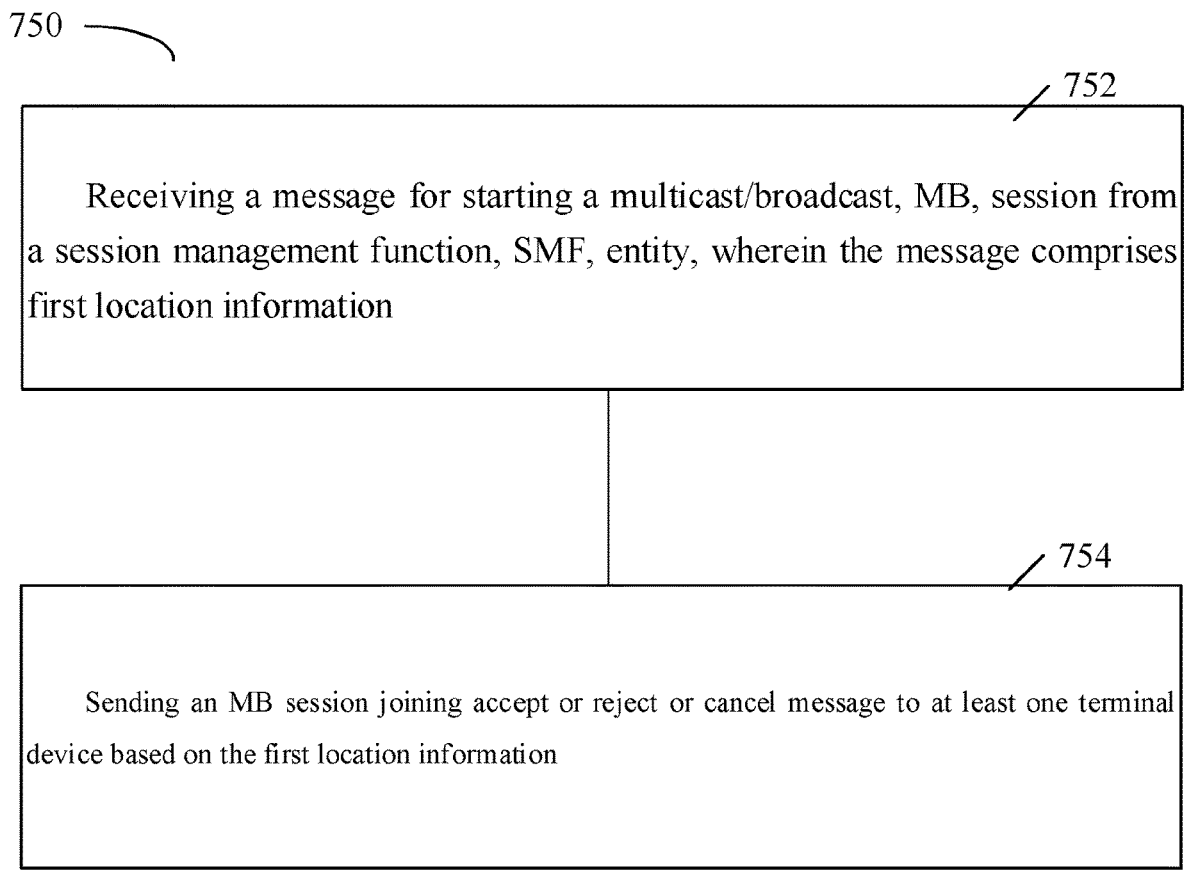
FIG. 7c shows a flowchart of a method according to an embodiment of the present disclosure.

FIG. 7c shows a flowchart of a method according to an embodiment of the present disclosure, which may be performed by an apparatus implemented in/as an access and mobility management function (AMF) entity or communicatively coupled to the AMF entity. As such, the apparatus may provide means or modules for accomplishing various parts of the method 750 as well as means or modules for accomplishing other processes in conjunction with other components.

At block 752, the AMF entity may receive a message for starting a multicast/broadcast, MB, session from a session management function, SMF, entity. The message may comprise first location information. The first location information may be any suitable location information.

In an embodiment, the first location information may comprise internal location information for a communication network. The communication network may be any suitable communication network such as 5G NR network. The internal location information can be directly used by the network element of the communication network.

In an embodiment, the first location information may comprise at least one of location criteria; at least one registration area; at least one SMF service area; at least one UPF service area; or at least one geographical area. For example, the first location information may be location criteria as described in 3GPP TS 23.503 V16.4.1.

In an embodiment, the first location information corresponds to second location information provided by an application function, AF, entity.

At block 754, the AMF entity may send an MB session joining accept or reject or cancel message to at least one terminal device based on the first location information. The AMF entity may obtain the position information of the terminal device in various ways. For example, when the AMF entity determines that the terminal device is out of a service area or location area defined by the first location information, the AMF entity may determine to reject the terminal device to join the MB session when the terminal device try to join the MB session or send a MB session join cancel message to the terminal device that has joined the MB session. Otherwise, the AMF entity may determine to accept the terminal device to join the MB session. In addition, the AMF entity may determine to accept or reject or cancel the terminal device to join the MB session based on the first location information in combination with any other suitable information. In an embodiment, the terminal device may have joined the MB session and then moved to another location. In an embodiment, the terminal device may be interested in using the MB session. In an embodiment, the terminal device may have subscribed to use the MB session. In an embodiment, the terminal device may be interested in using the MB session.

Figure 7D:
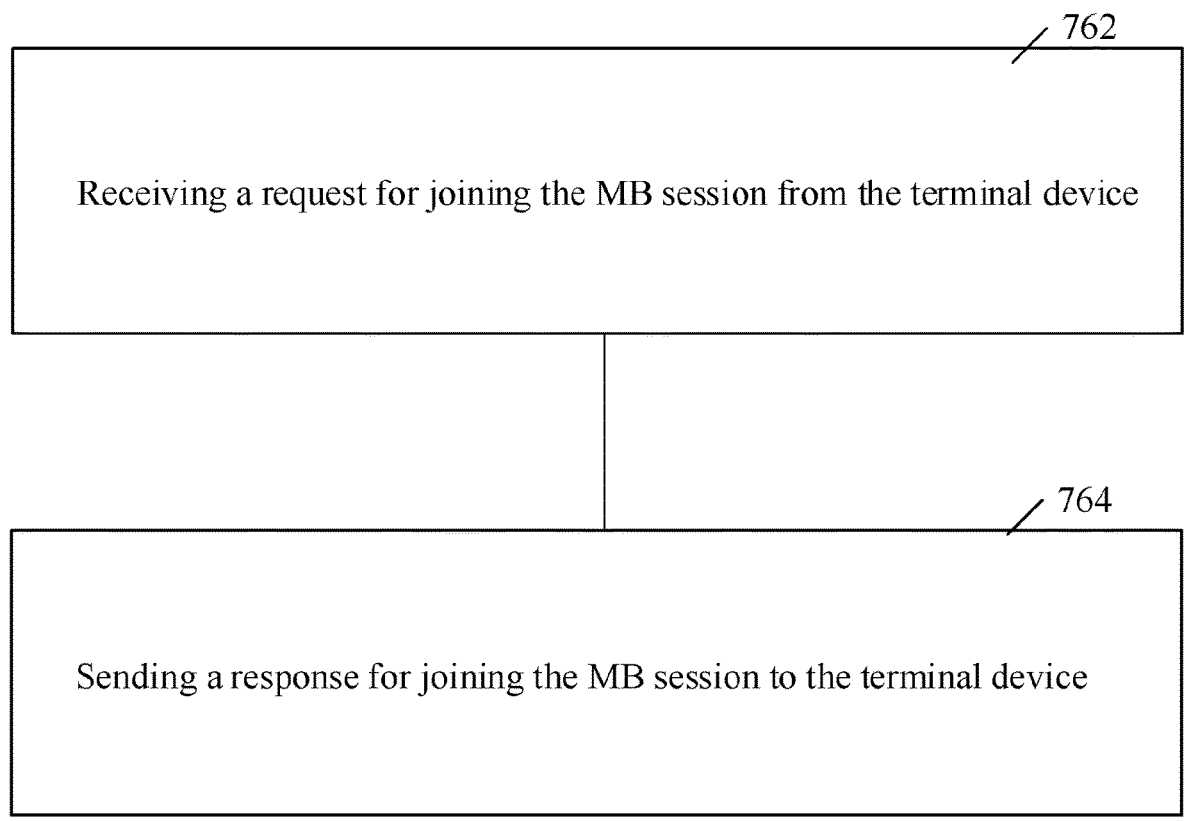
FIG. 7d shows a flowchart of a method according to another embodiment of the present disclosure.

As shown in FIG. 7d, at block 762, the AMF entity may receive a request for joining the MB session from the terminal device.

As shown in FIG. 7d, at block 764, the AMF entity may send a response for joining the MB session to the terminal device. The response for joining the MB session comprises the MB session joining accept or reject information determined based on the first location information.

In an embodiment, the request for joining the MB session is received prior to receiving the message for starting the MB session or after receiving the message for starting the MB session.

As shown in FIG. 7e, at block 772, the AMF entity may detect that previously joined at least one terminal device for the MB session is not within a local area defined by the first location information.

As shown in FIG. 7e, at block 774, the AMF entity may, in response to the detection, send, to at least one radio access network (RAN), a message for removing the previously joined at least one terminal device from the MB session.

As shown in FIG. 7e, at block 776, the AMF entity may send a message to the previously joined at least one terminal device to inform the previously joined at least one terminal device that its previous (MBS session) joining is cancelled.

As shown in FIG. 7e, at block 778, the AMF entity may send, to at least one radio access network (RAN), a message for allocating at least one resource for the MB session. The message for allocating at least one resource for the MB session comprises the first location information.

In an embodiment, the SMF entity may be an MB SMF entity.

Figure 7F:
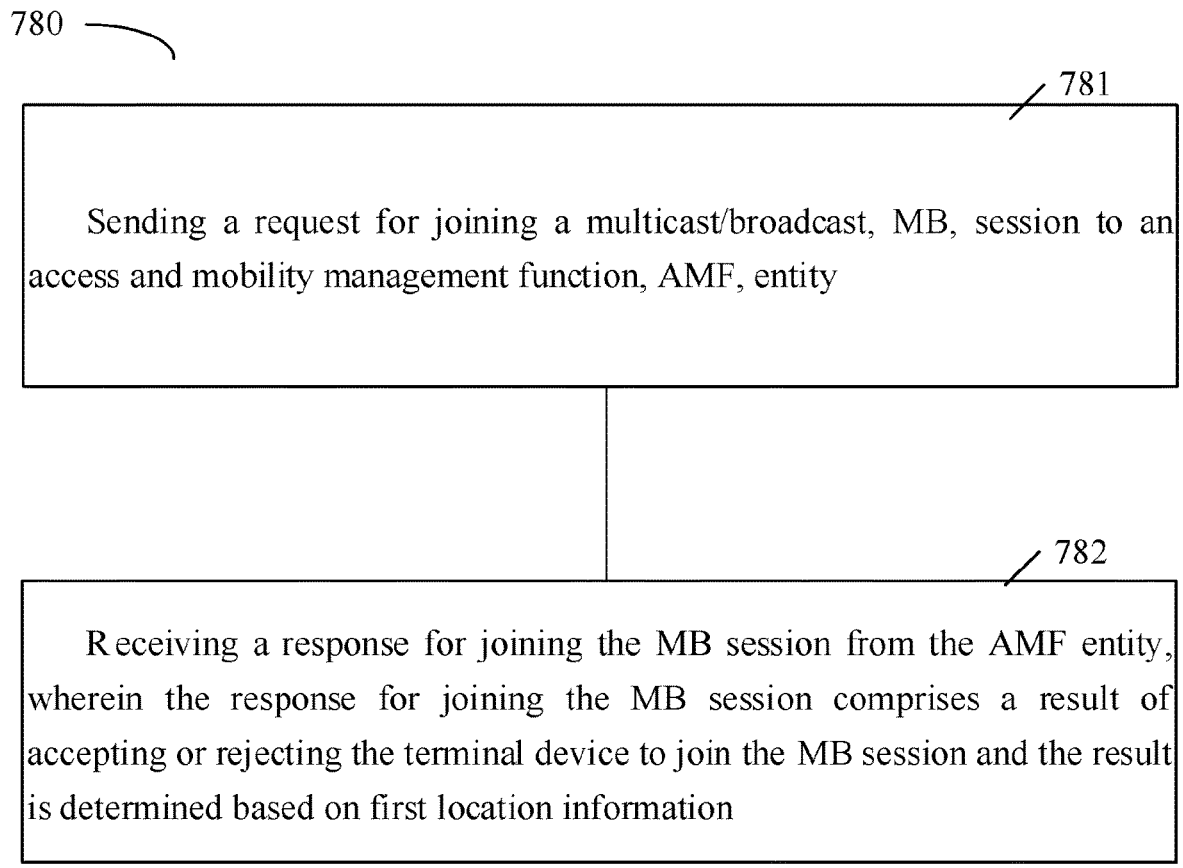
FIG. 7f shows a flowchart of a method according to another embodiment of the present disclosure.

FIG. 7f shows a flowchart of a method according to another embodiment of the present disclosure, which may be performed by an apparatus implemented in/as a terminal device or communicatively coupled to the terminal device. As such, the apparatus may provide means or modules for accomplishing various parts of the method 780 as well as means or modules for accomplishing other processes in conjunction with other components. For some parts which have been described in the above embodiments, detailed description thereof is omitted here for brevity.

At block 781, the terminal device may send a request for joining a multicast/broadcast, MB, session to an access and mobility management function, AMF, entity.

At block 782, the terminal device may receive a response for joining the MB session from the AMF entity.

In an embodiment, the response for joining the MB session comprises a result of accepting or rejecting the terminal device to join the MB session and the result is determined based on first location information.

In other embodiment, the response for joining the MB session from the AMF entity may be similar to the message of step 734 of FIG. 7b.

Figure 7G:
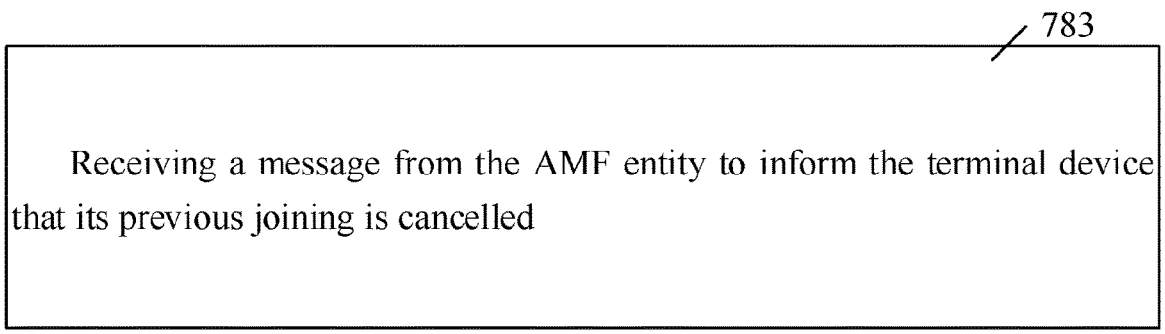
FIG. 7g shows a flowchart of a method according to another embodiment of the present disclosure.

As shown in FIG. 7g, at block 783, the terminal device may receive a message from the AMF entity to inform the terminal device that its previous joining is cancelled.

FIG. 7h shows a flowchart of a method according to another embodiment of the present disclosure, which may be performed by an apparatus implemented in/as a radio access network (RAN) or communicatively coupled to the radio access network (RAN). As such, the apparatus may provide means or modules for accomplishing various parts of the method 790 as well as means or modules for accomplishing other processes in conjunction with other components. For some parts which have been described in the above embodiments, detailed description thereof is omitted here for brevity.

At block 791, the radio access network (RAN) may receive, from an access and mobility management function, AMF, entity, a message for allocating at least one resource for a multicast/broadcast, MB, session. The message comprises first location information.

At block 792, the radio access network (RAN) may allocate or set up at least one resource for the MB session based on the first location information.

Figure 7I:
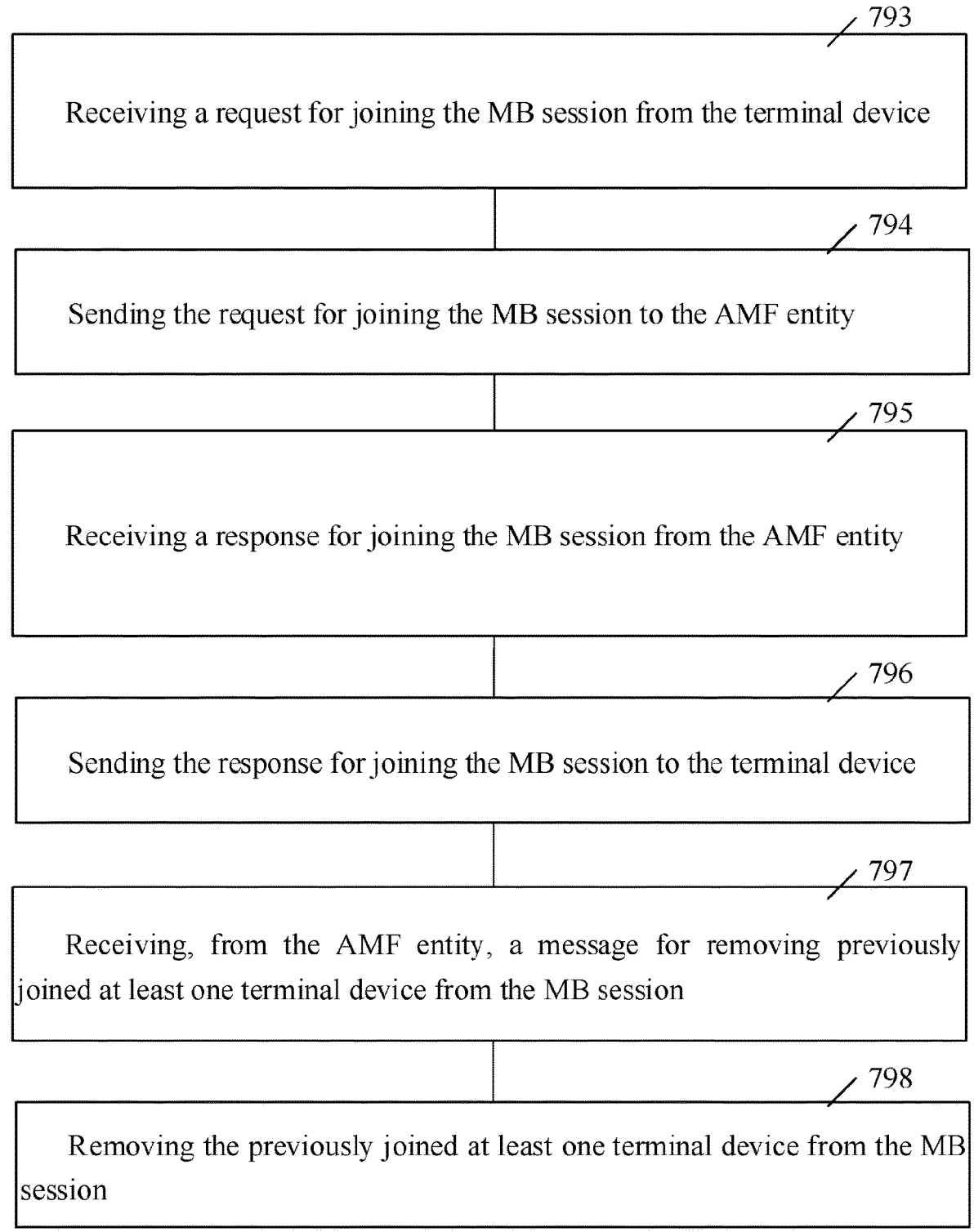
FIG. 7i shows a flowchart of a method according to another embodiment of the present disclosure.

As shown in FIG. 7i, at block 793, the radio access network (RAN) may receive a request for joining the MB session from the terminal device.

As shown in FIG. 7i, at block 794, the radio access network (RAN) may send the request for joining the MB session to the AMF entity.

As shown in FIG. 7i, at block 795, the radio access network (RAN) may receive a response for joining the MB session from the AMF entity.

In an embodiment, the response for joining the MB session comprises a result of accepting or rejecting the terminal device to join the MB session and the result is determined based on first location information.

As shown in FIG. 7i, at block 796, the radio access network (RAN) may send the response for joining the MB session to the terminal device.

As shown in FIG. 7i, at block 797, the radio access network (RAN) may receive, from the AMF entity, a message for removing previously joined at least one terminal device from the MB session.

As shown in FIG. 7i, at block 798, the radio access network (RAN) may remove the previously joined at least one terminal device from the MB session.

FIG. 7j shows a flowchart of a method according to another embodiment of the present disclosure, which may be performed by an apparatus implemented in/as a SMF entity or communicatively coupled to the SMF entity. As such, the apparatus may provide means or modules for accomplishing various parts of the method 7110 as well as means or modules for accomplishing other processes in conjunction with other components. For some parts which have been described in the above embodiments, detailed description thereof is omitted here for brevity.

At block 7111, the SMF entity may receive a request for starting a multicast/broadcast, MB, session from a multicast broadcast service function, MBSF, entity, wherein the request comprises first location information.

At block 7112, optionally, the SMF entity may select a user plane function, UPF, entity to allocate at least one resource for the MB session based on the first location information.

At block 7113, the SMF entity may send a message for starting the MB session to an access and mobility management function, AMF, entity, wherein the message comprises the first location information.

In an embodiment, the UPF entity is a MB UPF entity.

In an embodiment, the MBSF entity is included in a network exposure function, NEF, entity or a standalone entity.

In an embodiment, the SMF entity is an MB SMF entity.

FIG. 7k shows a flowchart of a method according to another embodiment of the present disclosure, which may be performed by an apparatus implemented in/as a MBSF entity or communicatively coupled to the MBSF entity. As such, the apparatus may provide means or modules for accomplishing various parts of the method 7120 as well as means or modules for accomplishing other processes in conjunction with other components. For some parts which have been described in the above embodiments, detailed description thereof is omitted here for brevity.

At block 7121, the MBSF entity may receive a request for activating a multicast broadcast service, MBS, bearer from an application function, AF, entity, wherein the request for activating the MBS bearer comprises second location information. The second location information can be any suitable information.

At block 7122, the MBSF entity may translate the second location information to first location information.

At block 7123, the MBSF entity may send a request for starting a multicast/broadcast, MB, session to a session management function, SMF, entity, wherein the request for starting the MB session comprises the first location information.

In an embodiment, the first location information and the second location information correspond to a local service area.

In an embodiment, the second location information comprises external location information for a communication network.

In an embodiment, the MBSF entity is included in a network exposure function, NEF, entity or a standalone entity.

Figure 8:
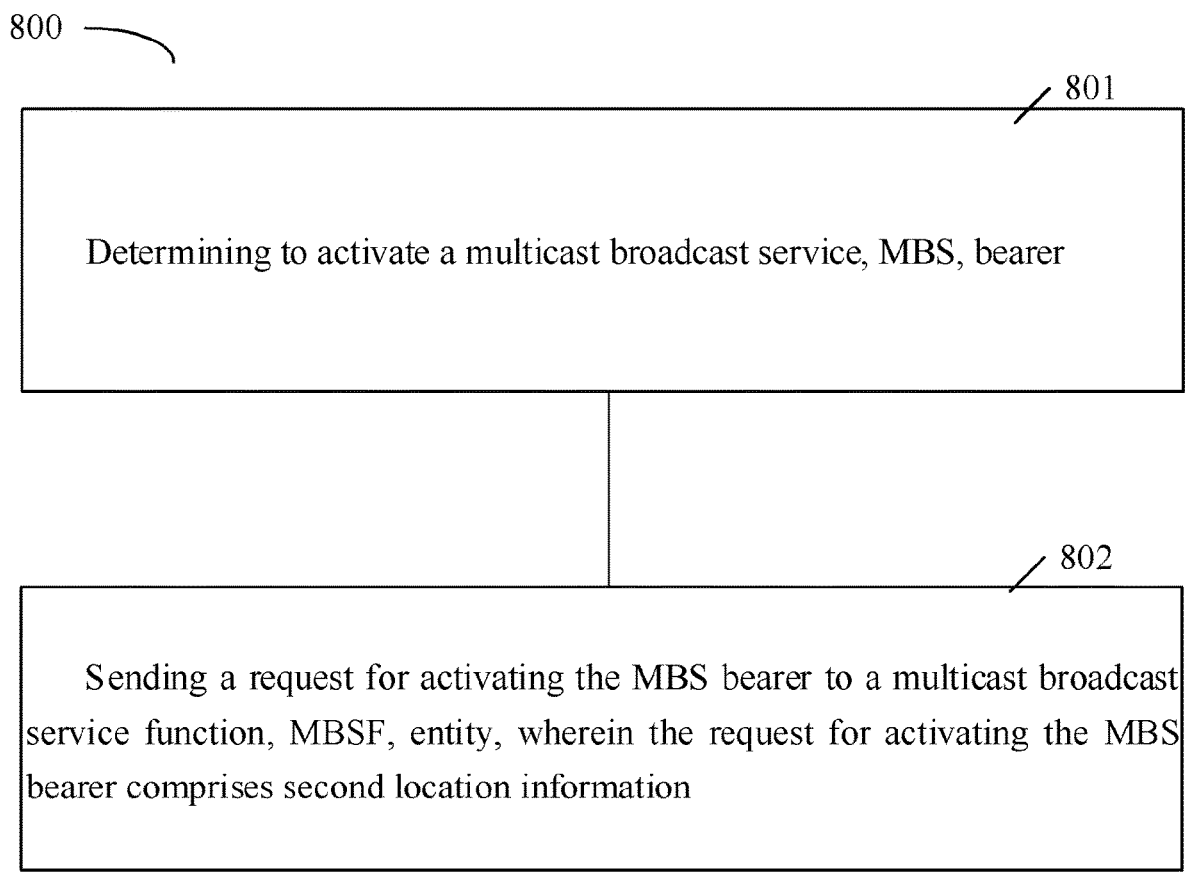
FIG. 8 shows a flowchart of a method according to another embodiment of the present disclosure.

FIG. 8 shows a flowchart of a method according to another embodiment of the present disclosure, which may be performed by an apparatus implemented in/as an AF entity or communicatively coupled to the AF entity. As such, the apparatus may provide means or modules for accomplishing various parts of the method 800 as well as means or modules for accomplishing other processes in conjunction with other components. For some parts which have been described in the above embodiments, detailed description thereof is omitted here for brevity.

At block 801, the AF entity may determine to activate a multicast broadcast service, MBS, bearer.

At block 802, the AF entity may send a request for activating the MBS bearer to a multicast broadcast service function, MBSF, entity, wherein the request for activating the MBS bearer comprises second location information.

In an embodiment, the second location information may comprise local service area information.

Figure 9A:
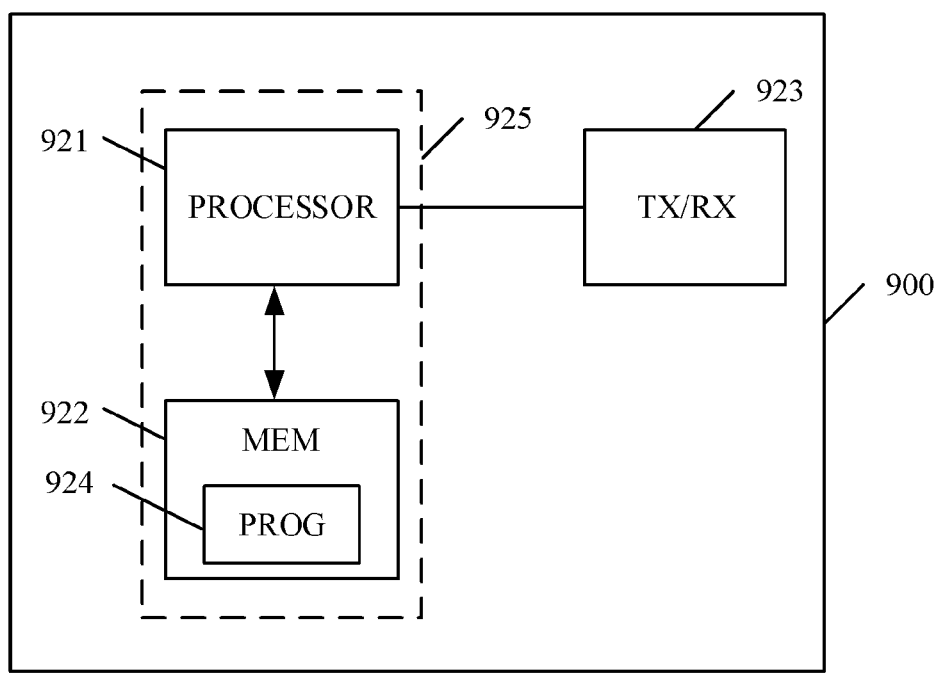
FIG. 9a is a block diagram showing an apparatus suitable for practicing some embodiments of the disclosure.

FIG. 9a is a block diagram showing an apparatus suitable for practicing some embodiments of the disclosure. For example, any one of the AMF entity, the terminal device, the radio access network (RAN), the SMF entity, the MBSF entity, or the AF entity as described above may be implemented as or through the apparatus 900.

The apparatus 900 comprises at least one processor 921, such as a digital processor (DP), and at least one memory (MEM) 922 coupled to the processor 921. The apparatus 920 may further comprise a transmitter TX and receiver RX 923 coupled to the processor 921. The MEM 922 stores a program (PROG) 924. The PROG 924 may include instructions that, when executed on the associated processor 921, enable the apparatus 920 to operate in accordance with the embodiments of the present disclosure. A combination of the at least one processor 921 and the at least one MEM 922 may form processing means 925 adapted to implement various embodiments of the present disclosure.

Various embodiments of the present disclosure may be implemented by computer program executable by one or more of the processor 921, software, firmware, hardware or in a combination thereof.

The MEM 922 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 921 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the AMF entity, the memory 922 contains instructions executable by the processor 921, whereby the AMF entity operates according to any step of any of the methods related to the AMF entity.

In an embodiment where the apparatus is implemented as or at the terminal device, the memory 922 contains instructions executable by the processor 921, whereby the terminal device operates according to any step of any of the methods related to the terminal device.

In an embodiment where the apparatus is implemented as or at the radio access network (RAN), the memory 922 contains instructions executable by the processor 921, whereby the radio access network (RAN) operates according to any step of any of the methods related to the radio access network (RAN).

In an embodiment where the apparatus is implemented as or at the SMF entity, the memory 922 contains instructions executable by the processor 921, whereby the SMF entity operates according to any step of any of the methods related to the SMF entity.

In an embodiment where the apparatus is implemented as or at the MBSF entity, the memory 922 contains instructions executable by the processor 921, whereby the MBSF entity operates according to any step of any of the methods related to the MBSF entity.

In an embodiment where the apparatus is implemented as or at the AF entity, the memory 922 contains instructions executable by the processor 921, whereby the AF entity operates according to any step of any of the methods related to the AF entity.

Embodiments herein afford many advantages, of which a non-exhaustive list of examples follows. In some embodiments herein, location information such as location criteria included in MB Session start may be used to select (MB-)SMF and for (MB-)SMF to select (MB-)UPF. In some embodiments herein, location information such as location criteria may be used by the AMF to accept or reject the UE joining an MBS Session. In some embodiments herein, location information such as location criteria may be used by the AMF to remove the UE from a previously joined TMGI. In some embodiments herein, location information such as location criteria can also include information such as Registration Area, SMF service area, UPF service area, etc. The embodiments herein are not limited to the features and advantages mentioned above. A person skilled in the art will recognize additional features and advantages upon reading the following detailed description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the AMF entity, the terminal device, the radio access network (RAN), the SMF entity, the MBSF entity, or the AF entity may not need a fixed processor or memory. The introduction of virtualization technology and network computing technology may improve the usage efficiency of the network resources and the flexibility of the network.

Further, the exemplary overall commutation system including the terminal device and the network node such as base station will be introduced as below.

Embodiments of the present disclosure provide a communication system including a host computer including: processing circuitry configured to provide user data; and a communication interface configured to forward the user data to a cellular network for transmission to a terminal device. The cellular network includes a base station above mentioned, and/or the terminal device is above mentioned.

In embodiments of the present disclosure, the system further includes the terminal device, wherein the terminal device is configured to communicate with the base station.

In embodiments of the present disclosure, the processing circuitry of the host computer is configured to execute a host application, thereby providing the user data; and the terminal device includes processing circuitry configured to execute a client application associated with the host application.

Embodiments of the present disclosure also provide a communication system including a host computer including: a communication interface configured to receive user data originating from a transmission from a terminal device; a base station. The transmission is from the terminal device to the base station. The base station is above mentioned RAN, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

Figure 9B:
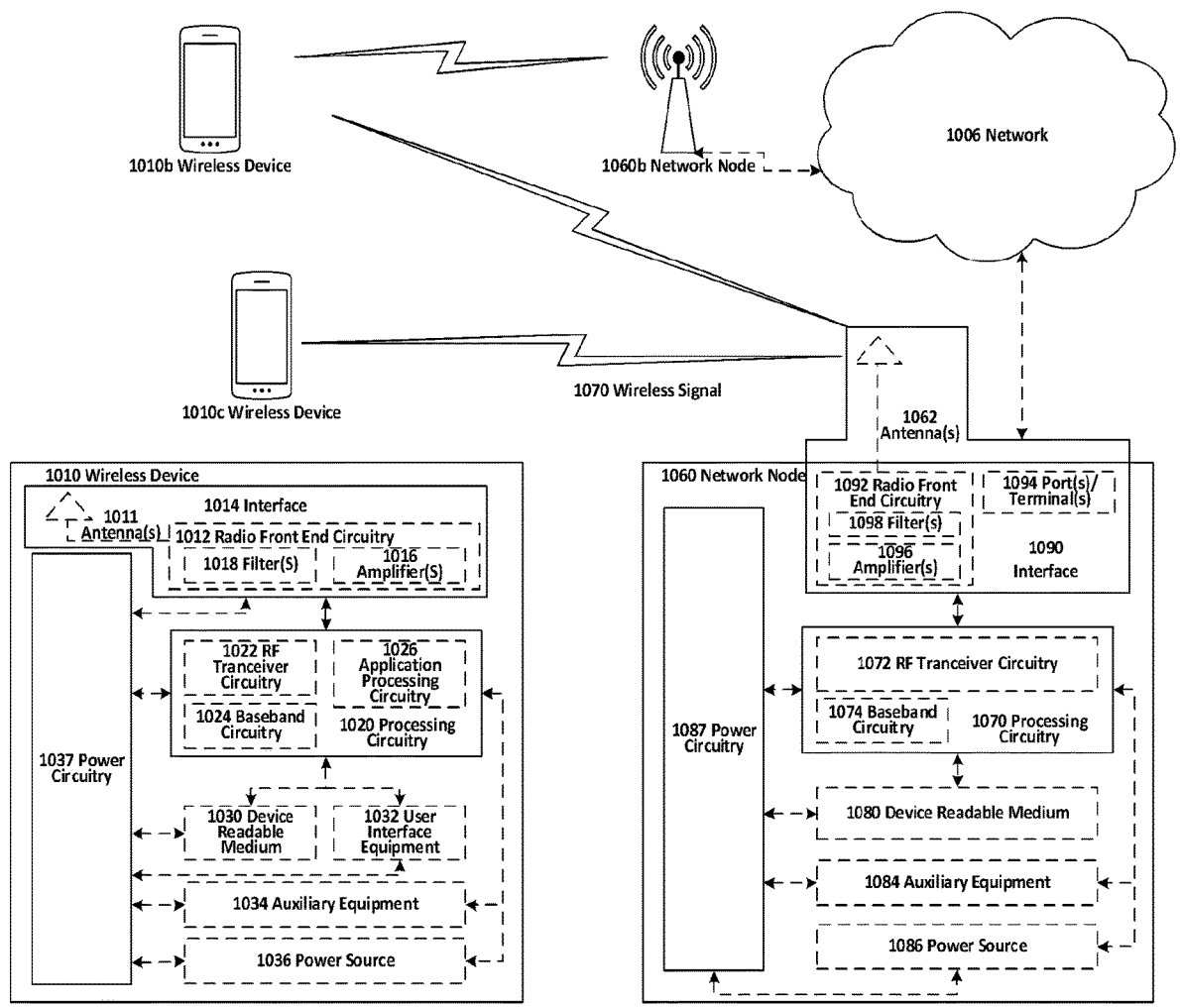
FIG. 9b is a schematic showing a wireless network in accordance with some embodiments.

FIG. 9*b* is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 9*b*. For simplicity, the wireless network of FIG. 9*b* only depicts network 1006, network nodes 1060 (corresponding to network side node) and 1060*b*, and WDs (corresponding to terminal device) 1010, 1010*b*, and 1010*c*. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9b, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 9b may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being executed by a network node. Any information, data and/or signals may be received from a wireless device, another network node and/or any other network equipment. Similarly, antenna 1062, interface 1090, and/or processing circuitry 1070 may be configured to perform any transmitting operations described herein as being executed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 9*b* that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being executed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being executed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being executed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 10:
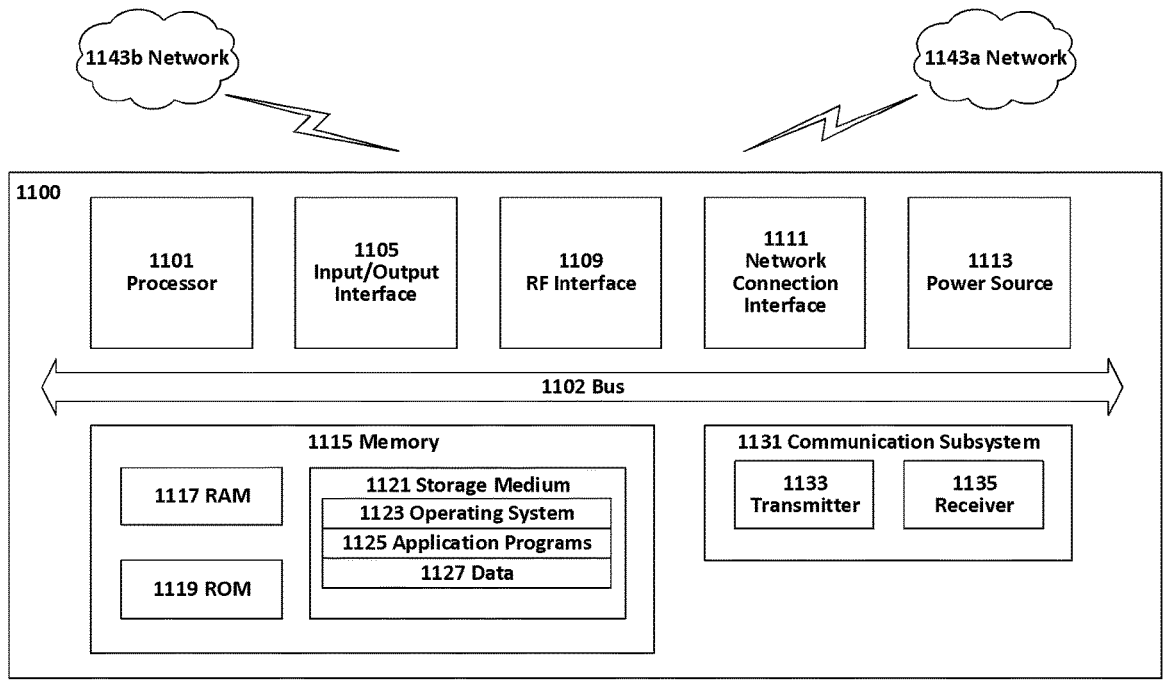
FIG. 10 is a schematic showing a user equipment in accordance with some embodiments.

FIG. 10 is a schematic showing a user equipment in accordance with some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DWIM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 10, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 11:
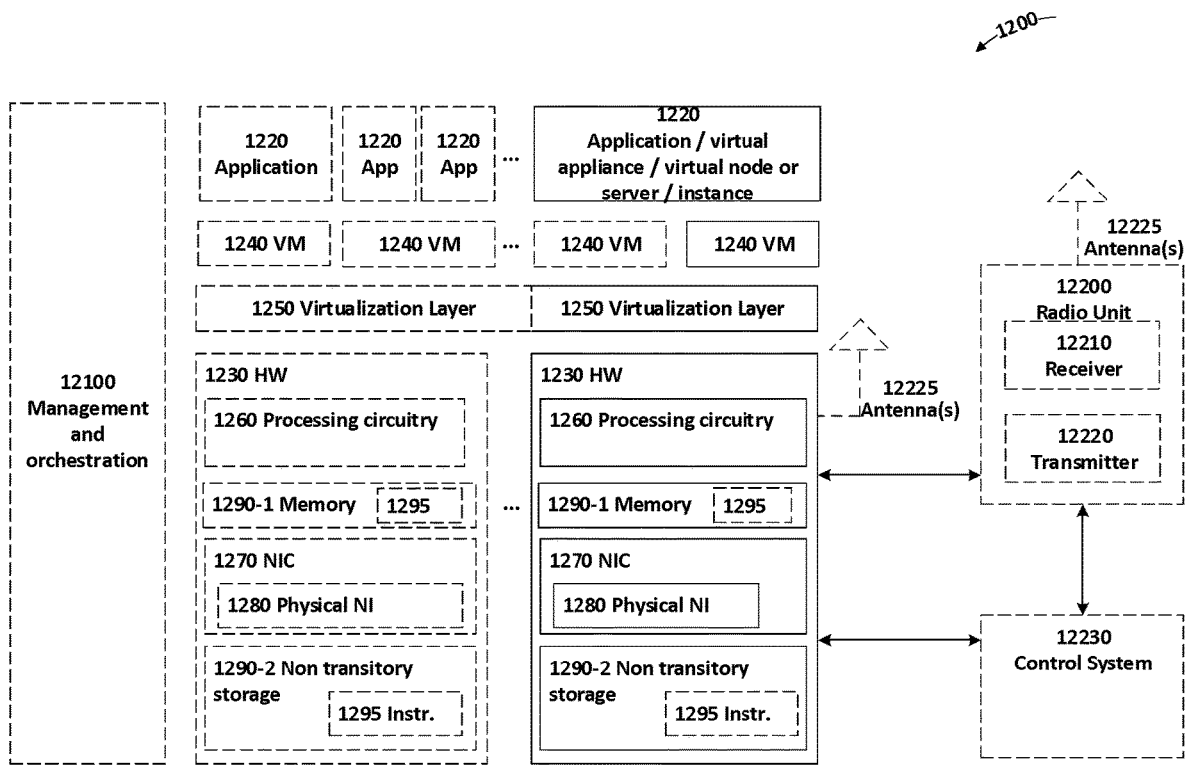
FIG. 11 is a schematic showing a virtualization environment in accordance with some embodiments.

FIG. 11 is a schematic showing a virtualization environment in accordance with some embodiments.

FIG. 11 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 11, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 11.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 12:
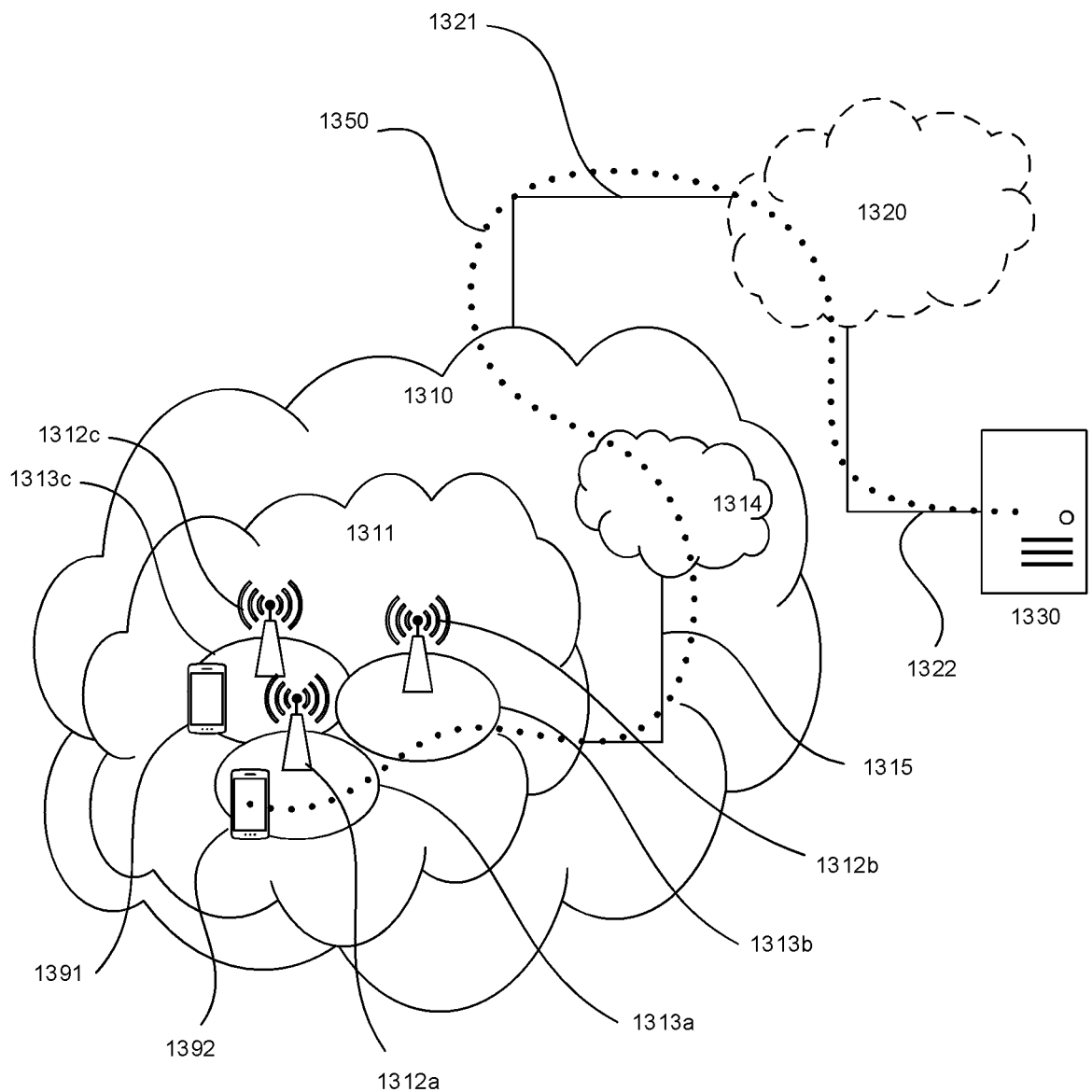
FIG. 12 is a schematic showing a telecommunication network connected via an intermediate network to a host computer in accordance with some embodiments.

FIG. 12 is a schematic showing a telecommunication network connected via an intermediate network to a host computer in accordance with some embodiments.

With reference to FIG. 12, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 12 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signalling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 13:
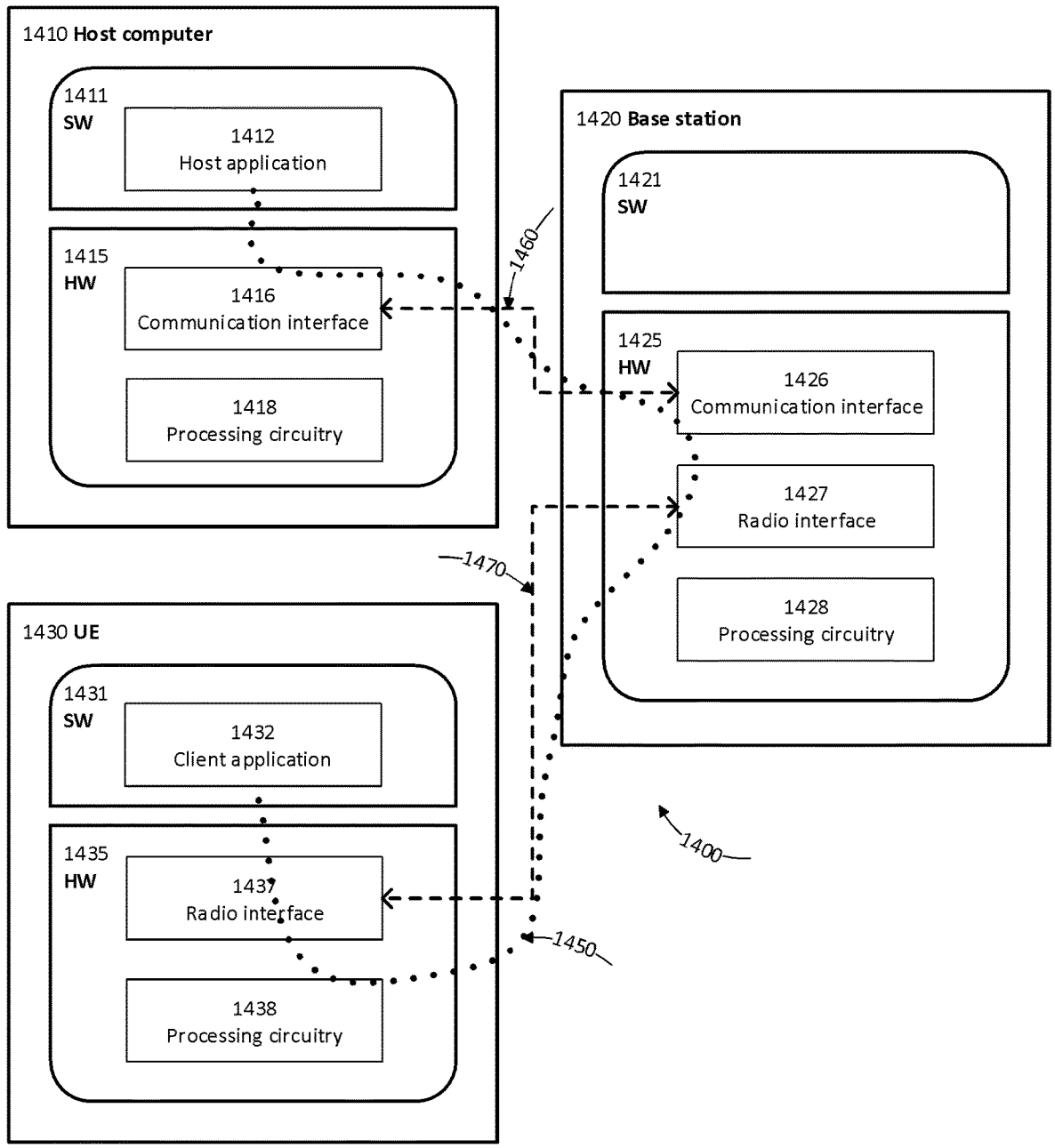
FIG. 13 is a schematic showing a host computer communicating via a base station with a user equipment over a partially wireless connection in accordance with some embodiments.

FIG. 13 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for allocating and maintaining a wired or wireless connection with an interface of a different communication device of communication system 1400, as well as radio interface 1427 for allocating and maintaining at least wireless connection 1470 with UE 1430 located in a coverage area (not shown in FIG. 13) served by base station 1420. Communication interface 1426 may be configured to facilitate connection 1460 to host computer 1410. Connection 1460 may be direct or it may pass through a core network (not shown in FIG. 13) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 13 may be similar or identical to host computer 1330, one of base stations 1312a, 1312b, 1312c and one of UEs 1391, 1392 of FIG. 12, respectively. This is to say, the inner workings of these entities may be as shown in FIG. 13 and independently, the surrounding network topology may be that of FIG. 12.

In FIG. 13, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signalling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 14:
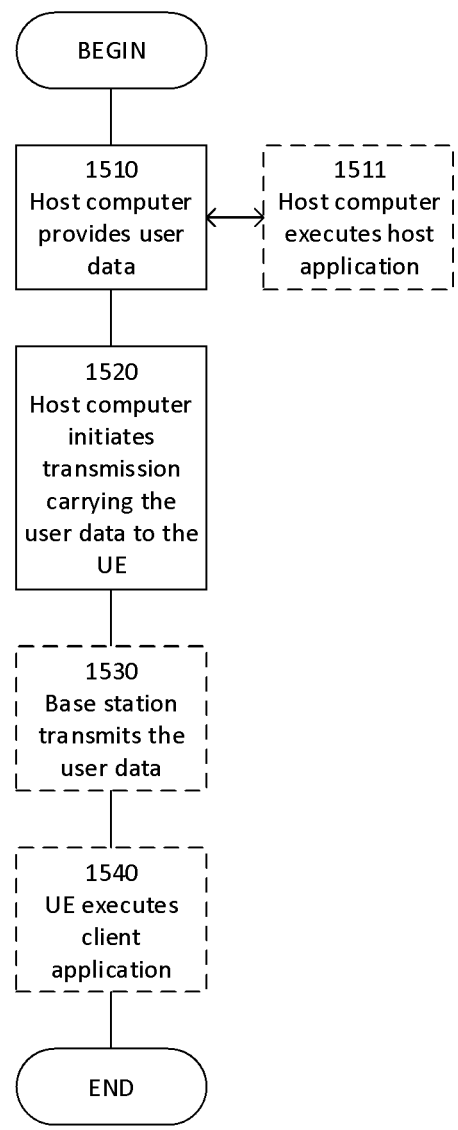
FIG. 14 is a schematic showing methods implemented in a communication system including a host computer, a base station and a user equipment in accordance with some embodiments.

FIG. 14 is a schematic showing methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 15:
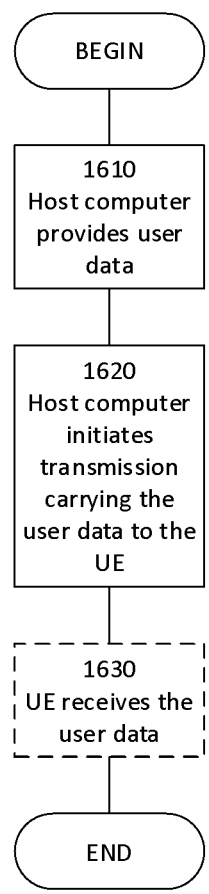
FIG. 15 is a schematic showing methods implemented in a communication system including a host computer, a base station and a user equipment in accordance with some embodiments.

FIG. 15 is a schematic showing methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 16:
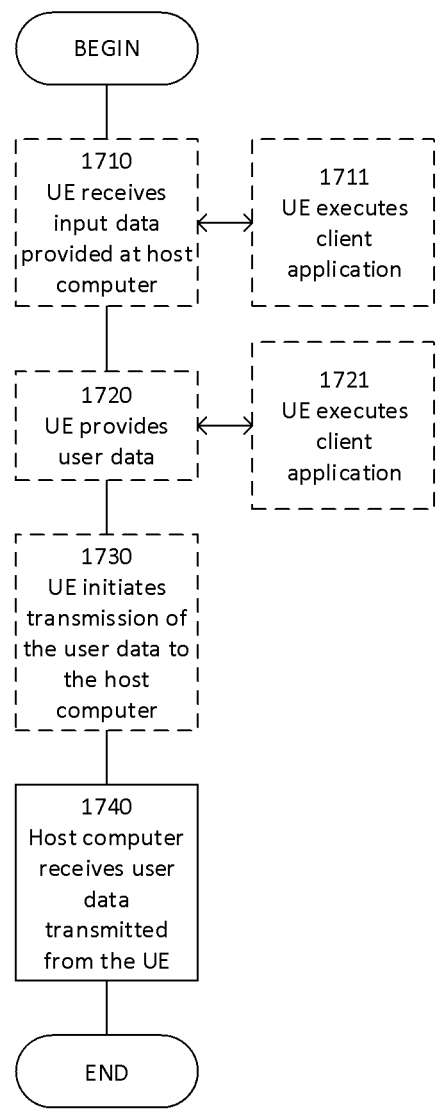
FIG. 16 is a schematic showing methods implemented in a communication system including a host computer, a base station and a user equipment in accordance with some embodiments.

FIG. 16 is a schematic showing methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 17:
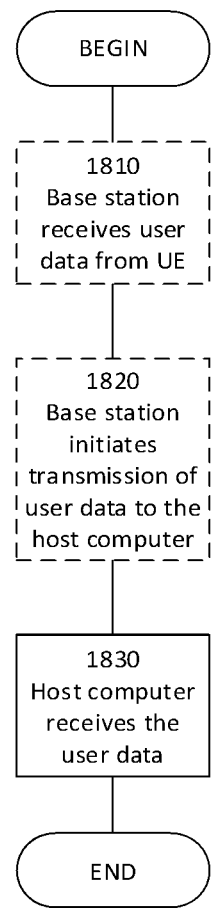
FIG. 17 is a schematic showing methods implemented in a communication system including a host computer, a base station and a user equipment in accordance with some embodiments.

FIG. 17 is a schematic showing methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

The invention claimed is:

1. A method implemented at a multicast/broadcast (MB) session management function (MB SMF) entity, the method comprising:

receiving a request for starting a MB session from a multicast/broadcast service function (MBSF) entity, wherein the MBSF entity is included in a network exposure function (NEF) entity or a standalone entity, wherein the request comprises a first location information, which corresponds to a second location information provided by an application function (AF), and wherein the first location information comprises:
location criteria,
at least one registration area,
at least one SMF service area,
at least one geographical area,
at least one user plane function (UPF) service area, or
any combination thereof;

selecting a MB user plane function (UPF) entity to allocate at least one resource for the MB session based on the first location information; and sending a message for starting the MB session to an access and mobility management function (AMF) entity, wherein the message comprises the first location information.

2. A method implemented at a multicast/broadcast service function (MBSF) entity, wherein the MBSF entity is included in a network exposure function (NEF) entity or a standalone entity, the method comprising:

receiving a request for activating a multicast/broadcast service (MBS) bearer from an application function (AF) entity, wherein the request for activating the MBS bearer comprises a second location information;

translating the second location information to a first location information; and sending a request for starting a multicast/broadcast (MB) session to a multicast/broadcast session management function (MB SMF) entity, wherein the MB SMF entity selects a MB user plane function (UPF) entity to allocate at least one resource for the MB session based on the first location information and wherein the request for starting the MB session comprises the first location information, in which the first location information comprises:
location criteria,
at least one registration area,
at least one SMF service area,
at least one geographical area,
at least one user plane function (UPF) service area, or
any combination thereof.

3. The method according to claim 2, wherein the second location information comprises external location information for a communication network.

4. A multicast/broadcast (MB) session management function (MB SMF) entity comprising:

a processor; and
a memory, the memory containing instructions which, when executed by the processor, cause the MB SMF entity to:
receive a request for starting a MB session from a multicast/broadcast service function (MBSF) entity, wherein the MBSF entity is included in a network exposure function (NEF) entity or a standalone entity, wherein the request comprises a first location information, which corresponds to a second location information provided by an application function (AF), and wherein the first location information comprises:
location criteria,
at least one registration area,
at least one SMF service area,
at least one geographical area,
at least one user plane function (UPF) service area, or
any combination thereof;
select a MB user plane function (UPF) entity to allocate at least one resource for the MB session based on the first location information; and
send a message for starting the MB session to an access and mobility management function (AMF) entity, wherein the message comprises the first location information.

5. A multicast/broadcast service function (MBSF) entity, wherein the MBSF entity is included in a network exposure function (NEF) entity or a standalone entity, comprising:

a processor; and
a memory, the memory containing instructions which, when executed by the processor, cause the (MBSF) entity to:
receive a request for activating a multicast/broadcast service (MBS) bearer from an application function (AF) entity, wherein the request for activating the MBS bearer comprises a second location information;
translate the second location information to a first location information; and
send a request for starting a multicast/broadcast (MB) session to a multicast/broadcast session management function (MB SMF) entity, wherein the MB SMF selects a MB user plane function (UPF) entity to allocate at least one resource for the MB session based on the first location information and wherein the request for starting the MB session comprises the first location information, in which the first location information comprises:
location criteria,
at least one registration area,
at least one SMF service area,
at least one geographical area,
at least one user plane function (UPF) service area, or
any combination thereof.

* * * * *